United States Patent
Vigesaa et al.

(10) Patent No.: US 7,480,921 B1
(45) Date of Patent: Jan. 20, 2009

(54) METHOD, SYSTEM, AND APPARATUS FOR CUSTOMIZING WEB PARTS

(75) Inventors: Eric B. Vigesaa, Seattle, WA (US);
Joshua Lindquist, Bellevue, WA (US);
Daniel Simmons, Sammamish, WA (US); Li Wang, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 677 days.

(21) Appl. No.: 10/675,173

(22) Filed: Sep. 30, 2003

Related U.S. Application Data

(63) Continuation-in-part of application No. 10/387,293, filed on Mar. 12, 2003, now Pat. No. 7,281,252.

(51) Int. Cl.
*G06F 13/00* (2006.01)

(52) U.S. Cl. .................. 719/330; 718/104; 709/201; 709/217; 709/218; 709/219

(58) Field of Classification Search ........... 719/310, 719/311, 313, 315, 316, 317, 318, 328, 330, 719/332; 709/201, 217, 219, 218; 718/104
See application file for complete search history.

(56) References Cited

U.S. PATENT DOCUMENTS

| | | | |
|---|---|---|---|
| 6,230,160 B1 | 5/2001 | Chan et al. ............. 707/103 X |
| 6,304,918 B1 | 10/2001 | Fraley et al. ................ 709/322 |
| 6,463,442 B1 | 10/2002 | Bent et al. ............. 707/103 R |
| 6,519,764 B1 | 2/2003 | Atkinson et al. ............ 717/120 |
| 6,757,707 B1 * | 6/2004 | Houghton et al. ........... 709/203 |
| 6,775,700 B2 | 8/2004 | Cheng et al. ................ 709/225 |
| 6,877,163 B1 | 4/2005 | Jones et al. ................. 719/332 |
| 6,947,965 B2 | 9/2005 | Glass ........................ 709/203 |
| 6,951,021 B1 | 9/2005 | Bodwell et al. ............. 719/316 |
| 6,993,569 B1 * | 1/2006 | Rees, Jr. ..................... 709/217 |
| 7,055,153 B2 | 5/2006 | Beck et al. .................. 719/315 |
| 7,058,599 B2 * | 6/2006 | Hanks et al. .................. 705/27 |
| 7,076,518 B1 * | 7/2006 | Twede ........................ 709/201 |
| 7,131,063 B2 * | 10/2006 | Mateos ....................... 715/513 |
| 2002/0004856 A1 | 1/2002 | Sudarshan et al. .......... 709/330 |
| 2002/0144012 A1 | 10/2002 | Hoennig et al. ............. 709/315 |
| 2002/0163520 A1 | 11/2002 | Hardin et al. ............... 345/475 |
| 2003/0115373 A1 | 6/2003 | Beck et al. .................. 709/315 |
| 2003/0177170 A1 | 9/2003 | Glass ........................ 709/203 |
| 2004/0111730 A1 | 6/2004 | Apte ......................... 719/330 |

OTHER PUBLICATIONS

Uwe Zdun, Dynamically Generating Web Application Fragments from Page Templates, 2002, ACM Press, pp. 1-11.*

(Continued)

*Primary Examiner*—Andy Ho
(74) *Attorney, Agent, or Firm*—Merchant & Gould

(57) ABSTRACT

A method, system, and apparatus for customizing web part objects. A web part object 28 that is capable of providing a presentation is accessed. Once the web part object is accessed, a specification file 38 associated with the web part object is also accessed. The specification file contains additional code, such as HTML, JAVA Script, or other code. The additional code is applied to a web part to modify the presentation of the web part. Thus, the presentation of the web part is modified in accordance with the specification file to provide a modified presentation.

20 Claims, 13 Drawing Sheets

OTHER PUBLICATIONS

W.R. Stanek, "Energizing Your Web Pages" (the Liveconnect Technology In Netscape's Open Network Environment and Microsoft's ActiveX Technology for Creating Dynamic Web Pages), *PC Magazine*, Sep. 1997, vol. 16, No. 15, p. 247.

Z. Oliphant, "Plug-Ins For Netscape Navigator: Extend Navigator and Internet Explorer Using The Plug-In API," *PC Magazine*, Feb. 1997, vol. 16, No. 3, p. 233.

R. Dragan, "Plugging In: The Live connect/Plug-In SDK 3.0, The Netscape Navigator Platform," *PC Magazine*, Oct. 1996, vol. 15, No. 17, p. 284.

G. Attardi, A. Cisternino, A. Yonezawa, S. Matsuoka, "Template Metaprogramming An Object Interface To Relational Tables," Reflection 2001 International Conference, Lecture Notes In Computer Science, Sep. 2001, p. 266-267.

G. Xiao-Lin, Q. De-Pei, "Binding Agents Supporting Inter-Object Communication For Internet-Based Meta System," *Chinese Journal of Computers*, Jan. 2000, vol. 25, No. 1, p. 100-105.

H. Fahmi, "Distributed Web-Based Framework for Real-Time Multimedia Object Communication," *Computer Systems Science and Engineering*, Purdue University, W. Lafayette, Mar. 2001, vol. 16, No. 2, p. 79-88.

L. Courtrai, Y. Maheo, F. Raimbault, "Java Objects Communication On A High Performance Network," Proceedings Ninth Euromicro Workshop On Parallel and Distributed Processing, IEEE Computer Society, Feb. 2001, p. 203-210.

Uwe Zdun, Dynamically Generating Web Application Fragments from Page Templates, Specification of Software Systems University of Essen, Germany zdun@acm.org, Jan. 11, 2002.

Andrew Meyer and Peter Taylor, E-commerce- and introduction, Special Feature E-Commerce, Computing & Control Engineering Journal, Jun. 2000.

\* cited by examiner

Test1

Suppliers

Refresh | Commands and Options... | Toolbar

| Company Name | City | Country | Contact Name | Phone |
|---|---|---|---|---|
| Leka Trading | Singapore | Singapore | Chandra Leka | 555-8787 |
| Lyngbysild | Lyngby | Denmark | Niels Petersen | 43844108 |
| Ma Maison | Montréal | Canada | Jean-Guy Lauzon | (514) 555-9022 |
| Mayumi's | Osaka | Japan | Mayumi Ohno | (06) 431-7877 |
| New England Seafood Cannery | Boston | USA | Robb Merchant | (617) 555-3267 |
| New Orleans Cajun Delights | New Orleans | USA | Shelley Burke | (100) 555-4822 |
| Nord-Ost-Fisch Handelsgesellschaft mbH | Cuxhaven | Germany | Sven Petersen | (04721) 8713 |
| Norske Meierier | Sandvika | Norway | Beate Vileid | (02)-953010 |
| Pasta Buttini s.r.l. | Salerno | Italy | Giovanni Giudici | (089) 6547665 |
| Pavlova, Ltd. | Melbourne | Australia | Ian Devling | (03) 444-2343 |
| PB Knäckebröd AB | Göteborg | Sweden | Lars Peterson | 031-987 65 43 |
| Plutzer Lebensmittelgroßmärkte AG | Frankfurt | Germany | Martin Bein | (069) 992755 |
| Refrescos Americanas LTDA | Sao Paulo | Brazil | Carlos Diaz | (11) 555 4640 |
| Specialty Biscuits, Ltd. | Manchester | UK | Peter Wilson | (161) 555-4448 |
| Svensk Sjöföda AB | Stockholm | Sweden | Michael Björn | 08-123 45 67 |
| Tokyo Traders | Tokyo | Japan | Yoshi Nagase | (03) 3555-5011 |

Products

Refresh | Commands and Options... | Toolbar

| SKU | Product Name | Unit Price | Units In Stock | Inventory Value |
|---|---|---|---|---|
| 4 | Chef Anton's Cajun Seaso | $22.00 | 53 | $1,166.00 |
| 5 | Chef Anton's Gumbo Mix | $21.35 | 0 | $0.00 |
| 65 | Louisiana Fiery Hot Pepp | $21.05 | 76 | $1,599.80 |
| 66 | Louisiana Hot Spiced Okr | $17.00 | 4 | $68.00 |
|  |  |  |  | $2,833.80 |

Product Detail

Refresh | Commands and Options... | Toolbar

Name Louisiana Fiery Hot Pepper Sauce

Package 32 - 8 oz bottles

Price $21.05

In Stock 76

On Order 0

*Fig. 8*

METHOD, SYSTEM, AND APPARATUS FOR CUSTOMIZING WEB PARTS

CROSS REFERENCE TO RELATED APPLICATION AND CLAIM OF BENEFIT

This application is a continuation in part of United States patent application entitled "Method, System, and Apparatus for Implementing Object Interfaces at Runtime" filed on Mar. 12, 2003 and assigned Ser. No. 10/387,293, now U.S. Pat. No. 7,281,252, which is incorporated by reference in its entirety as if fully set forth herein.

TECHNICAL FIELD

The invention relates generally to the field of object interfaces and, more specifically, to the field of object customization.

BACKGROUND OF THE INVENTION

In recent years, more and more programs have been designed to operate using a web based user interface. Such interfaces appear and operate as World Wide Web ("WWW" or the "Web") pages. While the applications provide the look and feel of a web interface, the actual program may reside on a remote computer connected via the Web, or locally on the user's computer.

As the web based interface has grown in popularity, the complexity of such interfaces has grown. In the beginning of the web, each web page was a single entity and every element of the page was stored in a single HTML document. As web development progressed, pages were broken up into separate components using frames or web parts. Such development greatly expanded the usability of web pages and allows web based programs to resemble typical non-web based programs.

One advance in the development of web pages is the use of web parts. Web parts represent a "part" of a web page. Such "parts" may include specialized applications which run independently within a web page. Web parts are typically separately compiled programs, referred to as web part assemblies, which are called and inserted into a page. If a web developer wishes to modify the web part, a programmer typically must modify and recompile the web part assembly. Alternatively, the web developer may insert customized HTML commands into a web page which operate to modify or add to the web part. Such additional HTML code must be reentered or copied into every other web page which calls that web part, if similar changes to the web part are desired on other web pages. Even then, if a change is made to this additional code, it must now be replicated in each page that includes the additional code.

Accordingly, a problem in the prior art is that a web part assembly can not be customized, simply and easily, without the need for recompiling.

Another problem in the prior art is that a customized web part assembly utilized in multiple instances cannot be modified without changing each instance of use of the web part assembly.

Another problem in the prior art is that, if separate commands are provided, they must be inserted into each web page which calls the web part assembly.

SUMMARY OF THE INVENTION

In accordance with the present invention, the above and other problems are solved by a method, system, and apparatus for customizing web part objects. The present invention allows users to simply and easily modify web part objects by adding code to a solution specification file associated with the web part. The code in the solution specification file is applied to the web part assembly to add to, subtract from, or modify the web part.

In accordance with other aspects, the present invention relates to a method for providing a customized web part. According to the method, a web part that is capable of providing a presentation is accessed. Once the web part is accessed, a specification file associated with the web part is also accessed. Then, the presentation of the web part is modified in accordance with the specification file to provide a modified presentation. This avoids the need to modify and re-compile the web part.

These and various other features as well as advantages, which characterize the present invention, will be apparent from a reading of the following detailed description and a review of the associated drawings.

BRIEF DESCRIPTION OF THE DRAWINGS

FIG. 8 shows an illustrative screen display including displays provided by several software components executing on a client computer and utilizing inter-object communication as provided by the various embodiments of the invention.

DETAILED DESCRIPTION OF THE INVENTION

Figure 1:
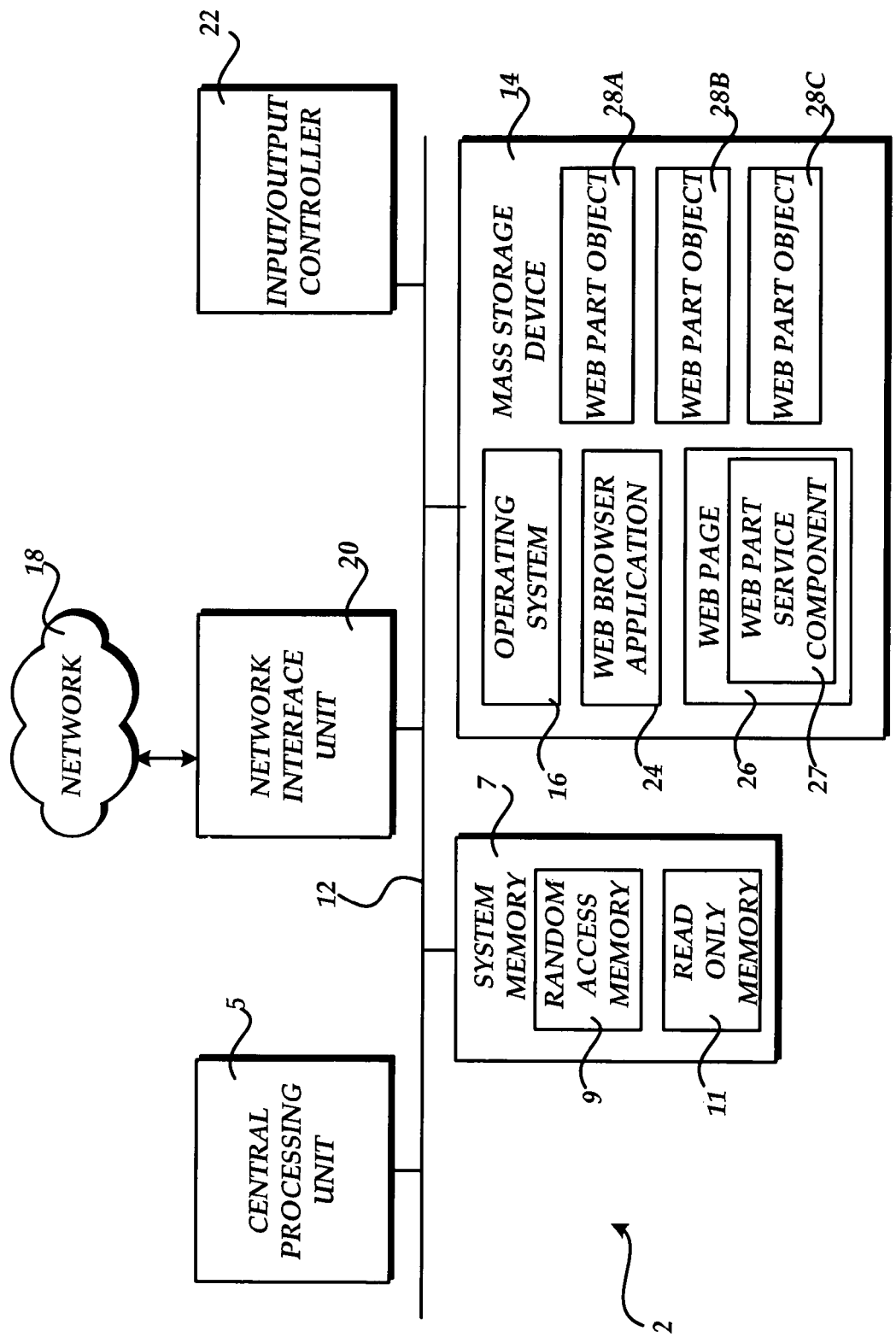
FIGS. 1 and 2 illustrate a computer architecture and various software components utilized by a client computer and a server computer, respectively, utilized in embodiments of the present invention.

Referring now to the drawings, in which like numerals represent like elements, a computer hardware and software architecture utilized by several computers provided in the various embodiments of the invention will be described. In particular, FIGS. 1 and 2 and the corresponding discussion are intended to provide a brief, general description of a suitable computing environment in which embodiments of the invention may be implemented. While the invention will be described in the general context of program modules that execute in conjunction with other program modules that run on an operating system on a personal or server computer, those skilled in the art will recognize that the invention may also be implemented in combination with other types of computer systems and program modules.

Generally, program modules include routines, functions, programs, components, data structures, and other types of structures that perform particular tasks or implement or operate on particular abstract data types. Moreover, those skilled in the art will appreciate that the invention may be practiced with other computer system configurations, including handheld devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a client computer 2 utilized in the various embodiments of the invention will be described. Those skilled in the art will recognize that general architecture described in conjunction with FIG. 1 is for example only and may be modified to accommodate various embodiments of the present invention and particular operational requirements. The computer architecture shown in FIG. 1 illustrates a conventional desktop computer, including a central processing unit 5 ("CPU"), a system memory 7, including a random access memory 9 ("RAM") and a non-volatile memory, such as a read-only memory ("ROM") 11, and a system bus 12 that couples the memory 7 and the CPU 5 to each other and to various other components. A basic input/output system containing the basic routines that help to transfer information between elements within the computer, such as during startup, is stored in the ROM 11. The client computer 2 typically further includes a mass storage device 14 for storing an operating system 16, application programs, and other program modules, which will be described in greater detail below.

The mass storage device 14 is generally connected to the CPU 5 through a mass storage controller (not shown) connected to the bus 12. The mass storage device 14 and its associated computer-readable media, provide non-volatile storage for the client computer 2. Although the description of computer-readable media contained herein generally refers to a mass storage device, such as a hard disk or CD-ROM drive, it should be appreciated by those skilled in the art that computer-readable media can be any available media that can be accessed by the client computer 2 or the server computer 30, described below.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the client computer 2 or the server computer 30, described below.

According to various embodiments of the invention, the client computer 2 may operate in a networked environment using logical connections to remote computers, such as the server computer 30, through a network 18, such as the Internet. The client computer 2 may connect to the network 18 through a network interface unit 20 connected to the bus 12. It should be appreciated that the network interface unit 20 may also be utilized to connect to other types of networks and remote computer systems. The client computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

A number of program modules and data files may be stored in the mass storage device 14 and RAM 9 of the client computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a Web browser application program 24 ("Web browser"). The Web browser 24 comprises an application program capable of requesting and rendering Web pages created in HTML or other types of markup languages, such as the Web page 26. An example of one such Web browser is the INTERNET EXPLORER Web browser from MICROSOFT CORPORATION or the NETSCAPE NAVIGATOR Web browser from NETSCAPE CORPORATION.

The Web browser 24 is also capable of executing scripts through the use of a scripting host. The scripting host executes program code expressed as scripts within the browser environment. For instance, INTERNET EXPLORER is capable of executing program code written in the JSCRIPT programming language from MICROSOFT CORPORATION. As known to those skilled in the art, JSCRIPT is a general-purpose object-based scripting language. Other Web browsers are capable of executing program code written in similar scripting languages in a similar fashion.

According to one embodiment of the invention, the Web browser 24 is operative to receive a Web page 26 that includes a WEB PART SERVICE COMPONENT ("WPSC") 27. The WPSC 27 is an intermediary object that mediates communication between client side objects executing in conjunction with the Web browser 24. More particularly, the WPSC 27, is utilized in conjunction with Web Part Page technologies from MICROSOFT CORPORATION. For example, the WINDOWS SHAREPOINT SERVICES ("WSS") and SHAREPOINT PORTAL SERVICES ("SPS") portal applications utilize the WPSC 27 for inter-object communication on the client computer 2. The WPSC 27 provides a standard framework for communication between client side objects, allows client side objects to recognize and interact with one another, provides session state management, state management, and item retrieve facilities. The WPSC 27 is typically rendered in JSCRIPT as a hidden object present in each Web page 26.

The Web browser 24 is also operative to execute one or more client side objects. As discussed briefly above, client side objects are executable objects that may be identified in a Web page 26 and executed in conjunction with the rendering of the Web page 26. For instance, JAVA applets or ACTIVEX controls may be identified on a Web page 26 and rendered by the Web browser 24 to generate a portion of the Web page 26 display.

According to one embodiment of the invention, the Web browser 24 is further operative to utilize client side objects called Web part objects 28A-28C (also referred to herein as "Web parts"). Web part objects 28A-28C are client side objects that stand alone and that are configured for use with the WPSC 27. Web parts 28A-28C are reusable components that contain Web-based content such as extensible markup language ("XML"), HTML, and scripts. Web parts 28A-28C have a set of standard properties that control how they are rendered. These properties make Web parts storage-neutral and completely reusable. Because Web parts adhere to a common standard, they may be stored in libraries that may be utilized to create a variety of Web pages 26. Web pages 26 that include Web part objects 28A-28C may be referred to herein as Web Part Pages.

According to one embodiment of the present invention, the Web part objects 28A-28C are operative to provide spreadsheet functionality within a Web page 26. In particular, the Web part objects 28A-28C are operative to provide functionality similar to that provided by a desktop spreadsheet application program such as the EXCEL spreadsheet application from MICROSOFT CORPORATION. As will be described in greater detail below, exemplary embodiments of the invention dynamically implement object interfaces for the Web parts 28A-28C that permit inter-object communication. For instance, a provider interface may be dynamically implemented for one of the Web parts 28A at runtime that allows the Web part 28A to provide the contents of a selected spreadsheet row and column, cell, or another combination of the one or more thereof, to another of the Web parts 28B-28C. A consumer interface may also be dynamically implemented at runtime that allows one of the Web parts 28B to accept and utilize data provided by another of the Web parts 28A. Additional details regarding the dynamic implementation of these interfaces is provided below.

While much of the present description address the operation of a spreadsheet web part assembly, those skilled in the art will recognize that this embodiment of the present invention is only illustrative and the scope of the invention may apply to all types of web part assemblies.

Figure 2:
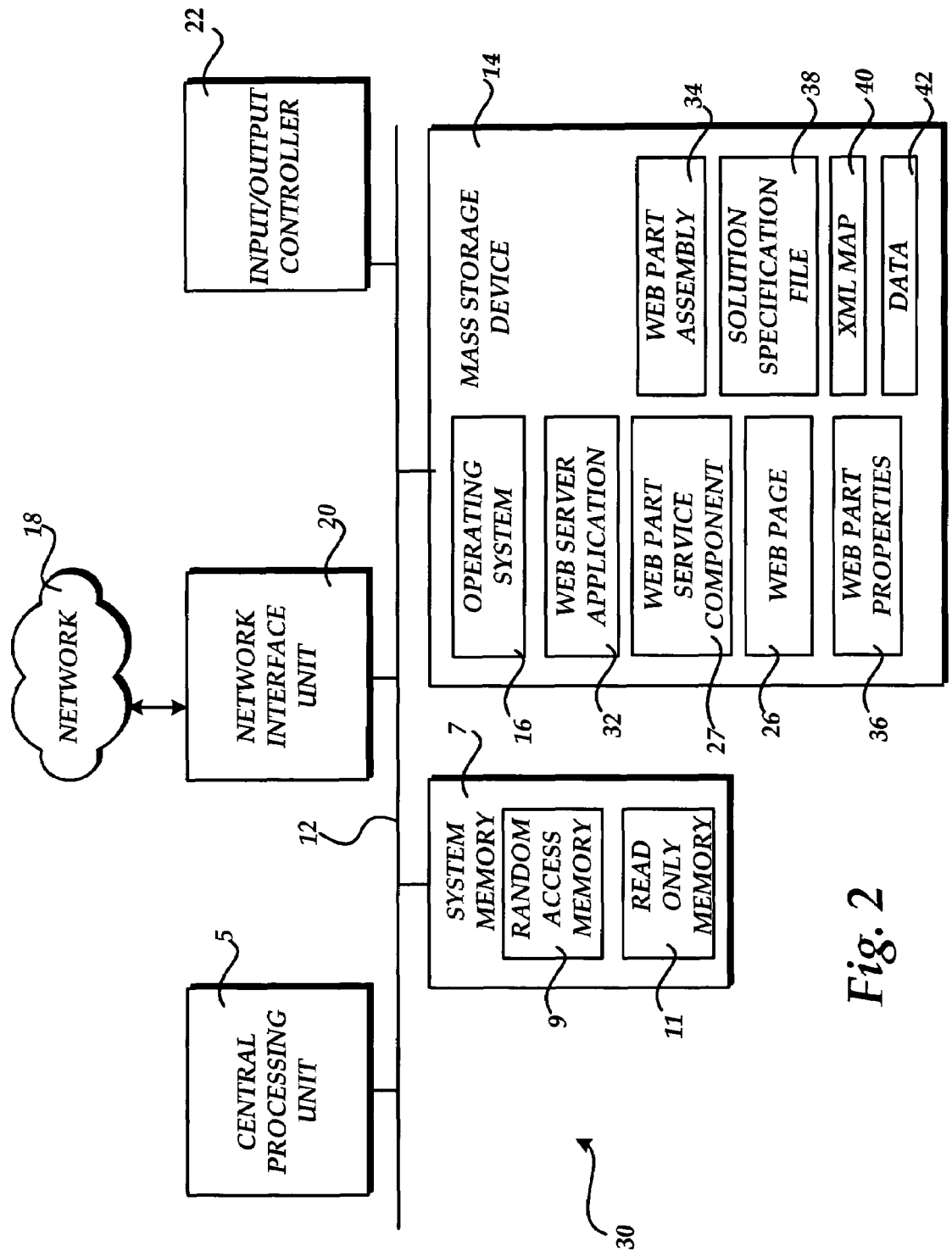

Referring now to FIG. 2, a server computer 30 utilized in the various embodiments of the invention will be described. Those skilled in the art will recognize that the server computer 30 described in FIG. 2 is an exemplary server configuration and may be modified to accommodate various embodiments of the present invention. As shown in FIG. 2, the server computer 30 includes many of the conventional computing components included in the client computer 2 and described above with respect to FIG. 1. In particular, the server computer 30 typically includes a CPU 5, a network interface unit 20 connected to a network 18, such as the Internet, a system memory 7 and a mass storage device 14. The mass storage device 14 utilized by the server computer 30 is typically operative to store an operating system 16 suitable for controlling the operation of a server computer. For instance, the operating system 16 may comprise the WINDOWS XP SERVER OPERATING SYSTEM from MICROSOFT CORPORATION.

The mass storage device 14 is generally also operative to store program modules for building and serving Web Part Sites. In particular, the mass storage device 14 may include the WSS or SPS portal applications from MICROSOFT CORPORATION. As a part of the WSS or SPS applications, the server computer 30 may utilize a Web server application 32. According to one embodiment of the invention, the Web server application 32 comprises the INTERNET INFORMATION SERVER application from MICROSOFT. It should be appreciated, however, that other types of Web server applications may be utilized.

The Web server application 32 receives and responds to requests from client computers, such as the client computer 2, for Web pages 26 located at or accessible to the server computer 30. It should be appreciated that Web pages as described herein include both those pages stored statically, such as those utilizing only HTML, and those pages generated dynamically through the use of server side scripting technologies, such as ACTIVE SERVER PAGES configured for use within the .NET environment ("ASP.NET" or "ASPX") from MICROSOFT CORPORATION.

According to various embodiments of the invention, the Web server application 32 may receive requests for Web pages 26 that include one or more Web parts 28A. As discussed above, Web parts 28A comprise client side objects that may be used by a Web browser when displaying a Web page 26. In conjunction with the provision of Web part objects 28, the Web server application 32 may render and serve a WPSC 27. The WPSC 27 may be rendered as a hidden object within the Web page 26 and provided to a client computer 2.

The mass storage device 14 utilized on the server computer 30 may also store Web part properties 36 associated with the Web part object 28A. The Web part properties 36 may be set by a solutions developer and contain data regarding the operation of the Web part object 28A. According to one embodiment of the invention, the Web part properties 36 include the location of a solution specification file 38, also referred to herein as a specification file, on the mass storage device 14 or located elsewhere. The solution specification file 38 typically includes data indicating whether one or more object interfaces should be implemented for the Web part object 28A at runtime. Moreover, if a runtime object interface is to be provided for the Web part object 28A, the solution specification file 38 defines the implementation of the object interface. The solution specification file 38 may also be utilized by a solution developer to specify the types of interfaces that should be implemented for the Web part object 28A at runtime.

Further, the solution specification file 38 may include additional code for customizing a web part object 28A for a particular use. In an exemplary embodiment of the present invention, such additional code is written in HTML. Alternatively, other code languages may be used or the HTML code may contain scripts, such as JavaScript or VBScript. For reasons described below, it is typically preferable for the additional code to be written in a language that does not require compiling, however any language capable of customizing a web part 28A may be used.

The solution specification file 38 may also include a pointer to an XML map 40. The XML map 40, also called the XML spreadsheet file herein, is utilized by the Web part object 28A to locate a source of data 42 for processing or display. Additionally, the XML map 40 indicates to the Web part object 28A the manner in which the retrieved data should be displayed. As will be described in greater detail below, the XML map 40 is located by the Web server application 32 and rendered into the Web page 26 prior to transmission to a requesting client computer 2.

The mass storage device 14 is also operative to store a Web Part Assembly 34 ("WPA"). The WPA 34 executes on the server computer 30 in conjunction with the Web server application 32. The WPA 34 communicates with the Web part object 28A executing on the client computer 2. Together, the WPA 34 and the Web part object 28A can provide functionality for performing tasks both on the client computer 2 and on server computer 30.

Typically, the WPA 34 is created by a programmer and must be recompiled after any changes are made to the file. Conversely, the solution specification file 38 may be created, maintained, implemented, and/or modified by a user who may or may not have significant programming knowledge. Accordingly, in an exemplary embodiment of the present invention, non-compiled code such as HTML may be included in the solution specification file 38 to modify the appearance of the web part 28. More specifically, the additional code may modify the HTML and any scripts to be rendered by the web part assembly 34, such as scripts rendered down to the client. Such modification may include, but is not limited to: adding or deleting buttons; adding or deleting images; adding or deleting functions; changing headings; writing scripts for a web part object; adding, deleting, or modifying data bindings; adding, deleting, or modifying XML maps; or any other desired modifications.

Figure 3:
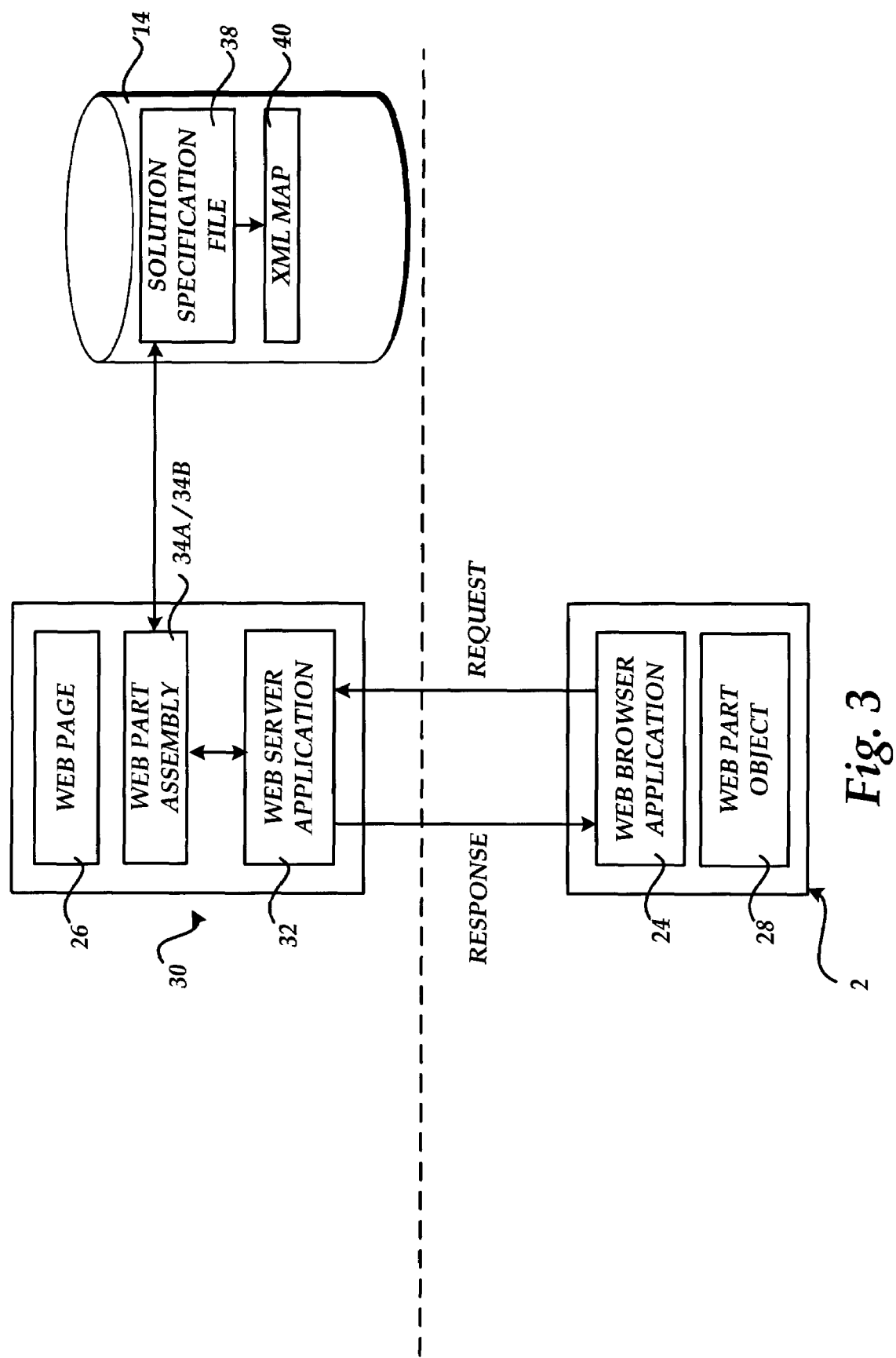
FIG. 3 shows aspects of the interaction between software components executing on a client computer and components executing on a server computer in one embodiment of the invention.
Figure 4:
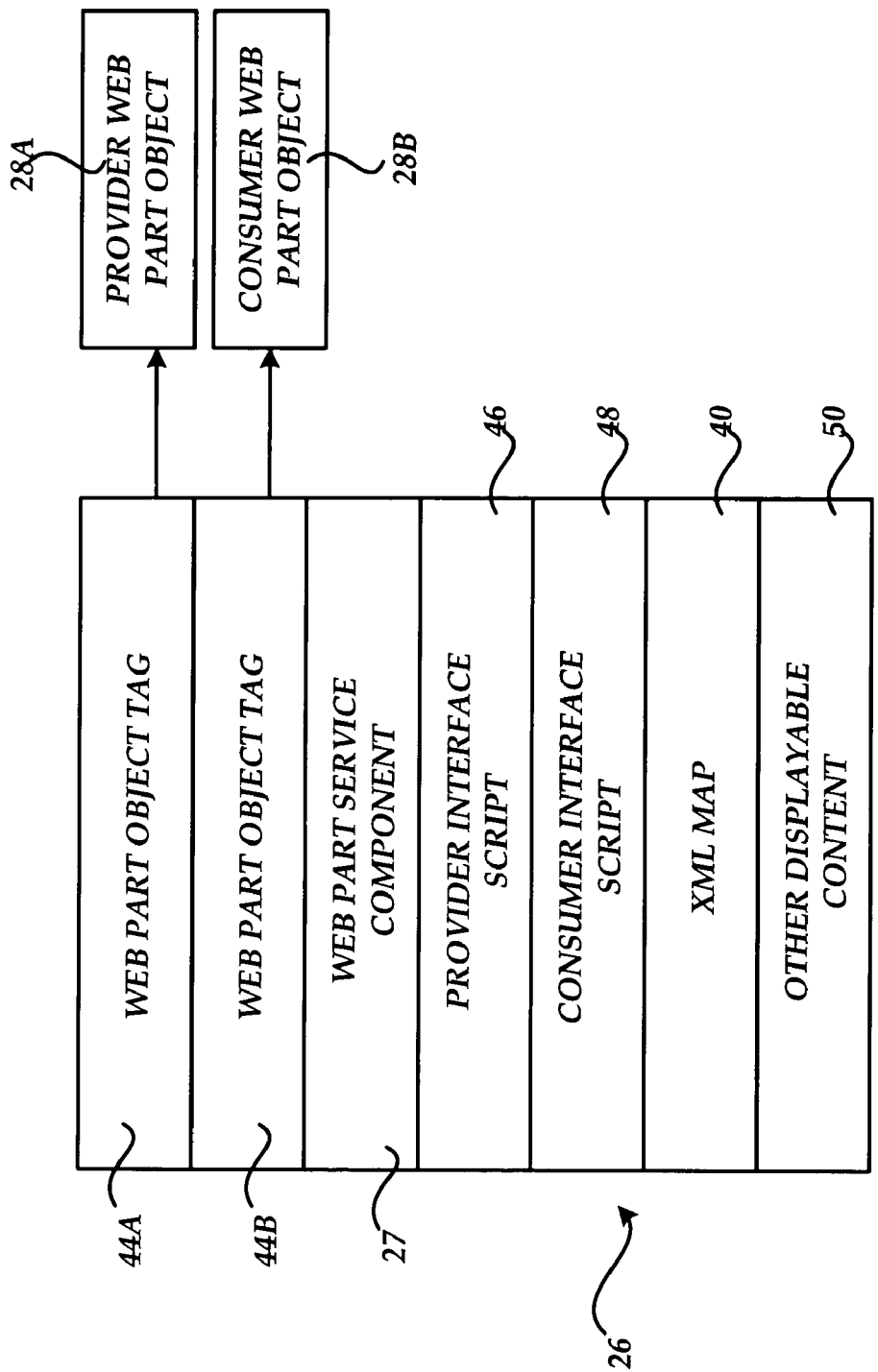
FIG. 4 shows the contents of a Web page generated by a server computer and utilized in one embodiment of the present invention.

Turning now to FIGS. 3 and 4, additional details for dynamically implementing a runtime interface will be provided. The Web browser application 24 may be utilized by a user to request a Web page 26 from the Web server application 32. In particular, the Web page 26 requested may include a reference to one or more assemblies 34 which, in turn, reference the appropriate Web part objects 28.

When a request is received at the Web server application 32 for the Web page 26, the Web server application 32 recognizes that the Web page 26 includes a reference to a Web part assembly 34. Accordingly, the Web server application 32 passes the request to the WPA 34. The WPA 34 then determines, based on the Web part properties 36, the location of a solution specification file 38 associated with the Web part object 28A. As described above, the solution specification file includes, among other things, a pointer to an XML map 40. The XML map 40 is utilized by the Web part object 28A when executing on the client computer 2 to locate, retrieve, and format data.

Once the WPA 34 has located the solution specification file 38 and the XML map 40, the contents of these two files are utilized by the Web server application 32 to render a portion of the contents of the Web page 26. In rendering these contents of the Web page 26, code in the solution specification file 38 may be used to modify the default appearance, or presentation, of the associated Web part 28.

Once the Web server application 23 has completed rendering the Web page 26, the Web page 26 is transmitted to the Web browser 24 in response to the original request.

In the examples described herein, the Web page 26 includes a reference to a Web part assembly 34A which, in turn, references the Web part object 28A that provides data to other Web parts, and includes a reference to a Web part assembly 34B that references a Web part object 28B that consumes data from other objects. It should be appreciated that while each of the Web part objects described herein is described as either consuming or providing data, each Web part may both consume and provide data.

Referring now to FIG. 4, an illustrative Web page 26 rendered by the Web server application 32 in response to a request from the client computer 2 for a Web page 26 will be described. The Web page 26 includes object tags 44A-44B which direct the Web browser application 24 to an instance of the Web part objects 28A-28B. By executing the object tags 44A-44B, the Web browser application 24 can instantiate the Web part objects 28A-28B. Accordingly, the Web server application 32 renders object tags 44A-44B into the Web page 26.

In addition to the object tags 44A-44B, the Web server application 32 also renders into the Web page 26 the WPSC 27. The WPSC 27 is rendered as a hidden object in the Web page 26. The WPSC 27 acts as an intermediary between the Web part objects 28A-28B rendered on the page and allows, among other things, inter-object communication.

As discussed above with respect to FIG. 3, the WPA 34 retrieves the solution specification file 38 prior to rendering the Web page 26. The WPA 34 also determines, based on the contents of the solution specification file 38, whether one or more object interfaces should be implemented for each of the Web part objects 28A-28B referenced in the Web page 26. If the solution specification file 38 indicates that an interface should be rendered for any of the Web part objects 28A-28B referenced on the Web page 26, scripts are rendered into the Web page 26 for implementing these interfaces. For example, as shown in FIG. 4, the Web part object 28A requires a provider interface so that it can provide data to other Web parts. Accordingly, a provider interface script 46 is typically rendered into the Web page 26. Table 1, below, illustrates a script for rendering a provider interface for providing data contained in rows of a spreadsheet.

TABLE 1

```
<SCRIPT LANGUAGE='JavaScript'>
<!--
if (document.all.SpreadsheetWPQ2.object != null)
{
var listObjectRowProvider1WPQ2WPQ2 = null;
var strMapEntryIDRowProvider1WPQ2WPQ2 = null;
try{
listObjectRowProvider1WPQ2WPQ2 =
document.all.SpreadsheetWPQ2.ActiveWorkbook.ListObject("1");
strMapEntryIDRowProvider1WPQ2WPQ2 = "1";
}catch (e) { }
if ((null != listObjectRowProvider1WPQ2WPQ2) && (null !=
strMapEntryIDRowProvider1WPQ2WPQ2)){
var fieldNamesRowProvider1WPQ2WPQ2 =
listObjectRowProvider1WPQ2WPQ2.PropNames.toArray();
var fieldNamesValidRowProvider1WPQ2WPQ2 =
Spreadsheet_ValidatePropNames(fieldNamesRowProvider1WPQ2WPQ2
);
if (true == fieldNamesValidRowProvider1WPQ2WPQ2) {
var interfaceNameRowProvider1WPQ2WPQ2 = "RowProvider1WPQ2";
var RowProvider1WPQ2WPQ2 = new
SpreadsheetRowProvider(strMapEntryIDRowProvider1WPQ2WPQ2,
fieldNamesRowProvider1WPQ2WPQ2,
interfaceNameRowProvider1WPQ2WPQ2);
} else {alert("There is an error with the RowProvider connection interface
of the Suppliers Web Part. Check for invalid values in the Web Part's
Solution Specification file or XML Spreadsheet file.");}
} else {alert("The <MapEntryID> for a RowProvider interface on the
Suppliers Web Part is invalid.");}
var propertiesSpreadsheetToPivotChartWPQ2WPQ2= new Array(3);
}
//-->
</SCRIPT>
```

The Web part object 28B typically includes a consumer interface for receiving data from other Web parts. Accordingly, in an exemplary embodiment of the present invention, a consumer interface script 48 is rendered into the Web page 26 for implementing an interface for the Web part object 28B. Table 2, below, illustrates a script for providing a consumer interface for receiving data contained in rows of a spreadsheet provided through the provider interface described above.

TABLE 2

```
<SCRIPT LANGUAGE='JavaScript'>
<!--
if (document.all.SpreadsheetWPQ3.object != null)
{
var inFieldsRowConsumerProdWPQ3WPQ3 = new Array(1);
var bindingsRowConsumerProdWPQ3WPQ3 = new Array(1);
var paramIdsRowConsumerProdWPQ3WPQ3 = new Array(1);
inFieldsRowConsumerProdWPQ3WPQ3[0] = "SupplierID";
bindingsRowConsumerProdWPQ3WPQ3[0] = "Binding1";
paramIdsRowConsumerProdWPQ3WPQ3[0] = "Supplier";
var RowConsumerProdWPQ3WPQ3 = new
SpreadsheetRowConsumerDSP(document.all.SpreadsheetWPQ3,
inFieldsRowConsumerProdWPQ3WPQ3,
```

TABLE 2-continued

```
bindingsRowConsumerProdWPQ3WPQ3,
paramIdsRowConsumerProdWPQ3WPQ3);
}
//-->
</SCRIPT>
```

As briefly discussed above, the solution specification file 38 generally includes a pointer to the XML map 40. The XML map 40 includes data for each of the Web parts 28A-28B that identify the location of a source of data to be utilized by the Web parts. Moreover, the XML map 40 specifies to the Web parts 28A-28B how the retrieved data should be formatted and displayed. Accordingly, the Web server application 32 typically renders into the Web page 26 the contents of the XML map 40.

The Web server application 32 may also render into the Web page 26 other displayable content 50. This may include HTML, XML, references to non-Web part client side objects, and other types of content that may be utilized by the Web browser application 24 to display the Web page 26.

Figure 5:
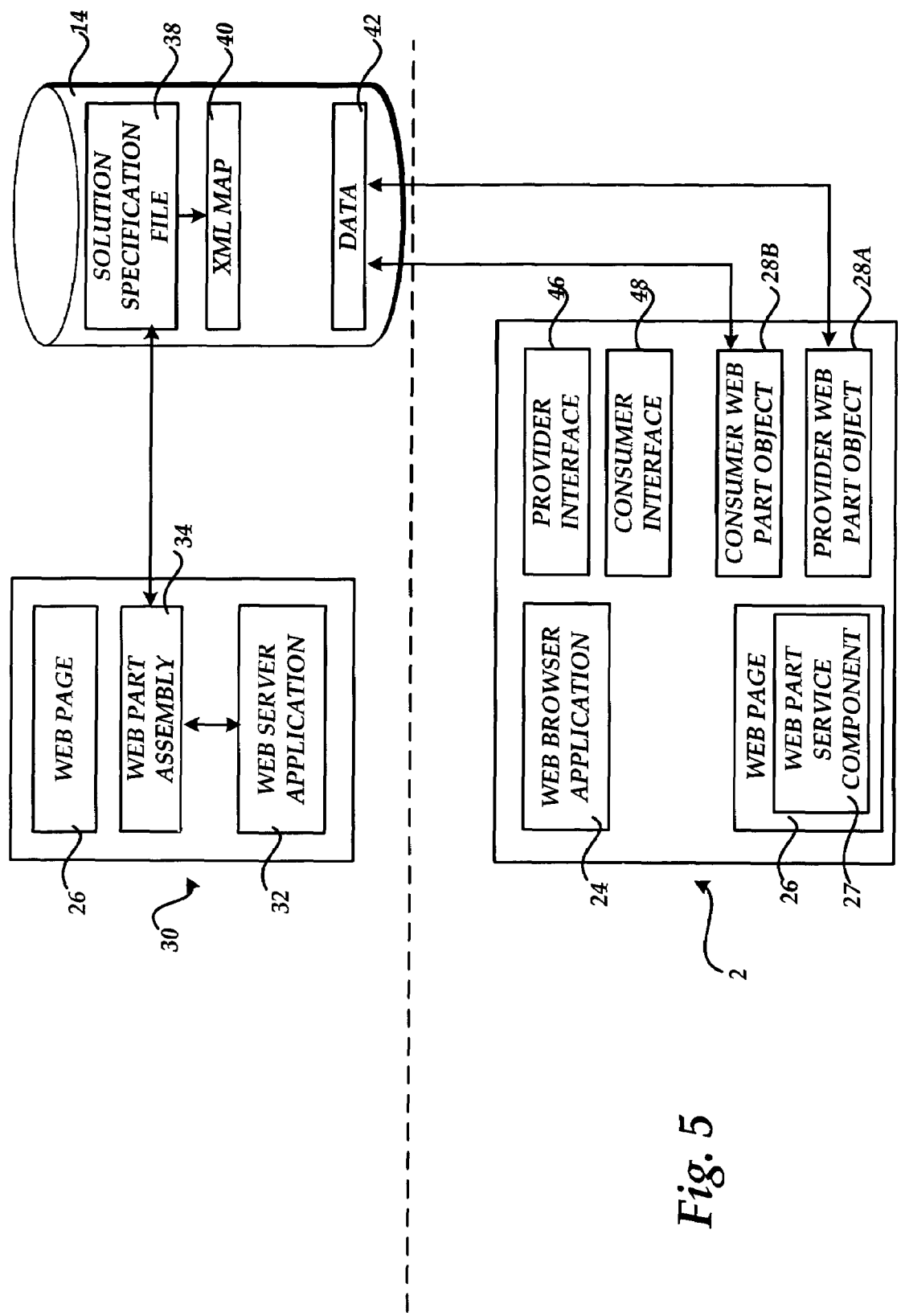
FIG. 5 shows additional aspects regarding the interaction between software components executing on a client computer and components executing on a server computer in one embodiment of the invention.

Turning now to FIG. 5, additional details regarding the display and functionality provided by the Web page 26 on the client computer 2 will be described. The Web browser application 24 includes a script host for executing scripts. Accordingly, when the Web browser application 24 receives the WPSC 27, the provider interface 46, and the consumer interface 48 from the server application 32, these scripts are executed. Additionally, when the Web browser application 24 renders the Web page 26, the object tags 44A-44B cause the provider Web part object 28A and the consumer Web part object 28B to be instantiated by the Web browser 24.

When the Web part objects 28A-28B are instantiated, these objects utilize the contents of the XML map 40 to locate a source of data 42. Once the data 42 has been located by the Web part objects 28A-28B, the data may be retrieved and displayed. It should be appreciated that although the data 42 is illustrated as being stored at the server computer 30, this data may be stored at any location on a distributed computing network. Also, the Web part objects 28A-28B utilize the XML map 40 to properly display the retrieved data 42. For example, as described above, the Web part objects 28A-28B may provide functionality for implementing spreadsheet functions within a Web page 26.

Briefly referring to FIG. 8, the data 42 may comprise spreadsheet tables 62A and 62B to be displayed by the Web part objects 28A-28B, respectively. The XML map 40 identifies to the Web part objects 28A and 28B how these tables should be rendered within the Web page 60. The provider interface 46 allows the table 62A to provide data to another Web part object. Similarly, the consumer interface 48 allows the table 62B to consume and utilize data provided by another Web part. For instance, spreadsheet row data may be provided from the table 62A to the table 62B. The row data may then be utilized to sort the table 62B.

Figure 6:
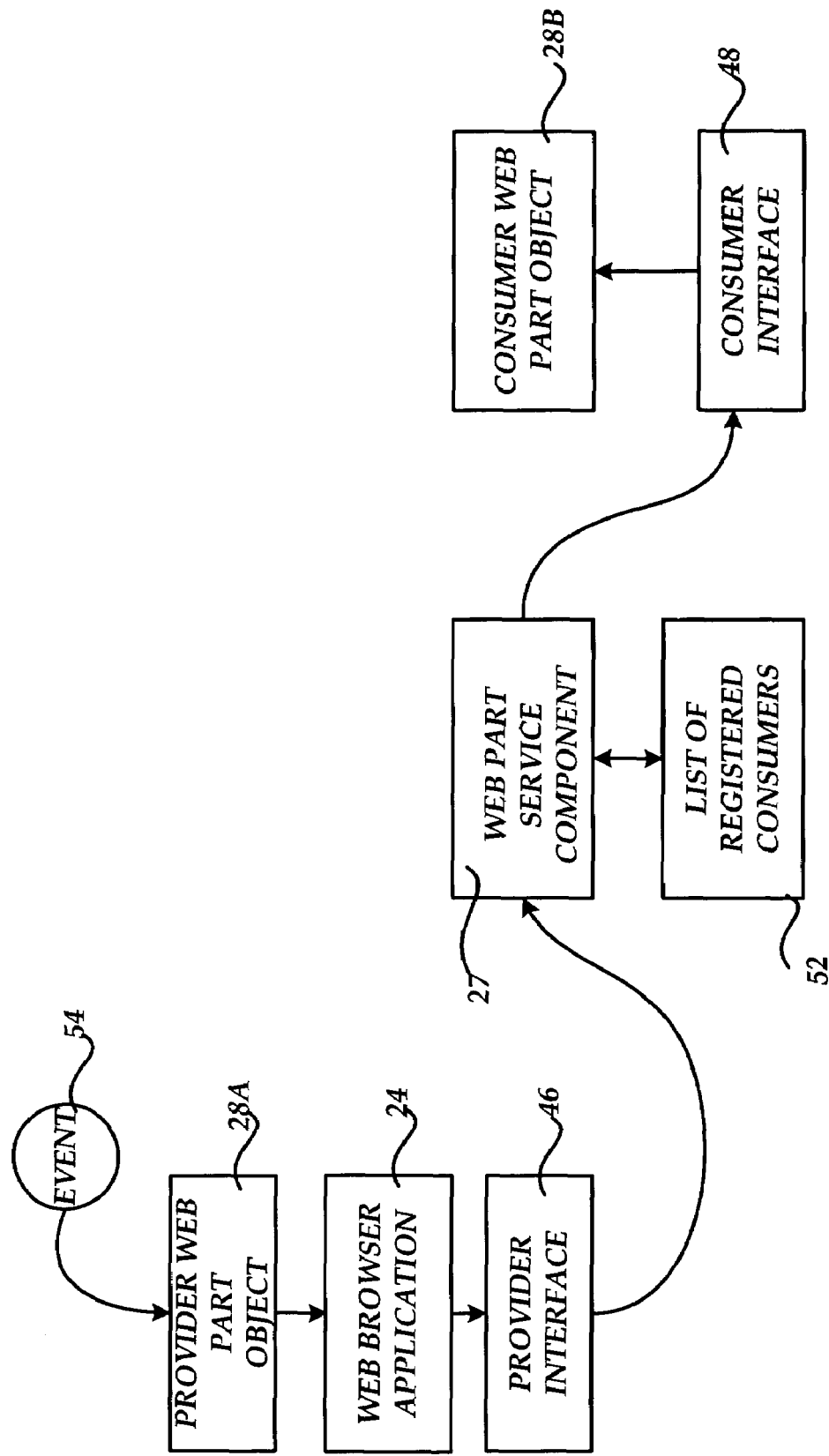
FIG. 6 illustrates the operation of various software components executing within a client computer and operative to implement an object at runtime for inter-object communication in one embodiment of the invention.
Figure 7A:
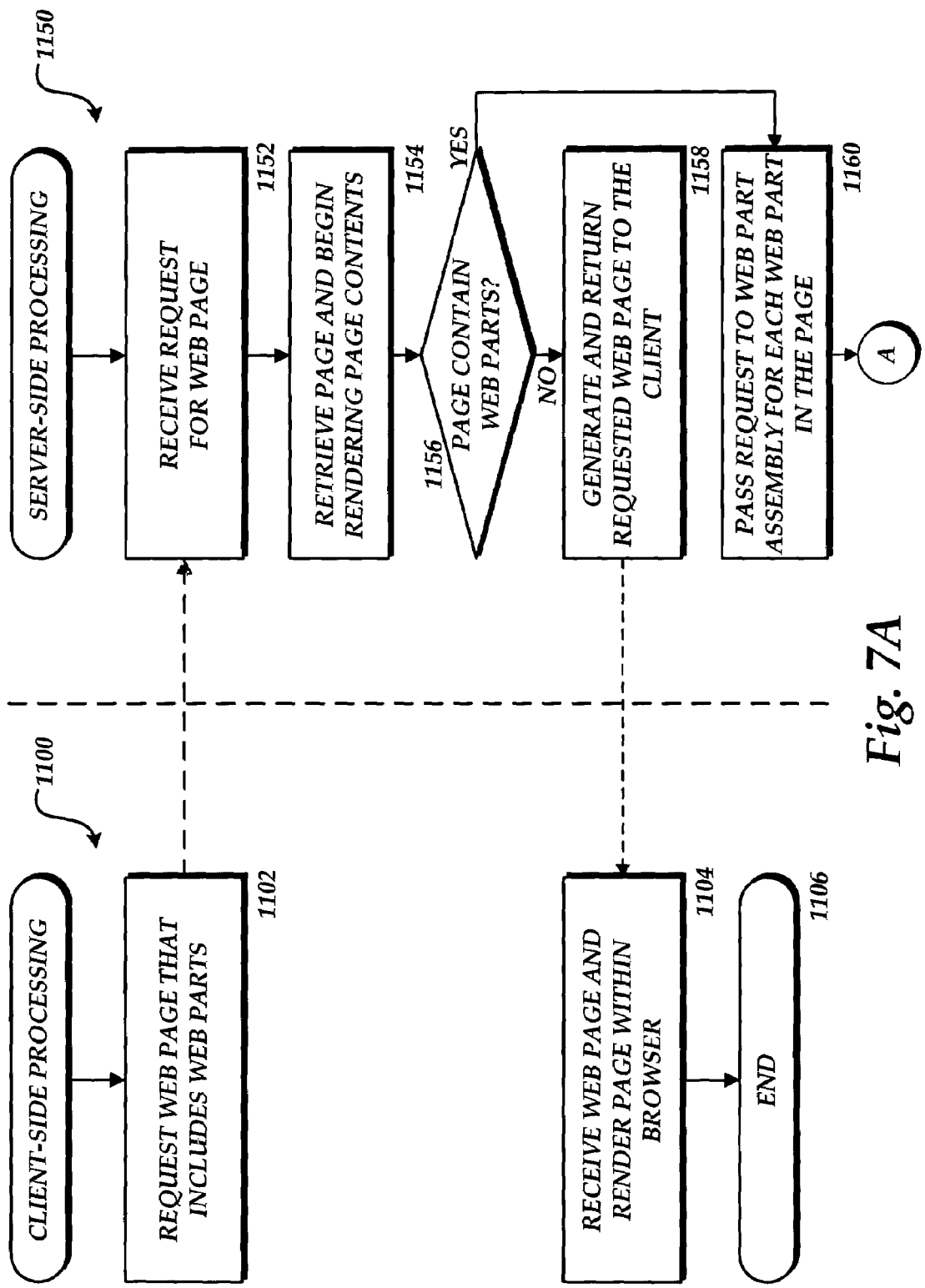
FIGS. 7A-7E illustrate an operational process performed by a client computer and a server computer for implementing object interfaces at runtime that permit inter-object communication according to one embodiment of the invention.
Figure 7B:
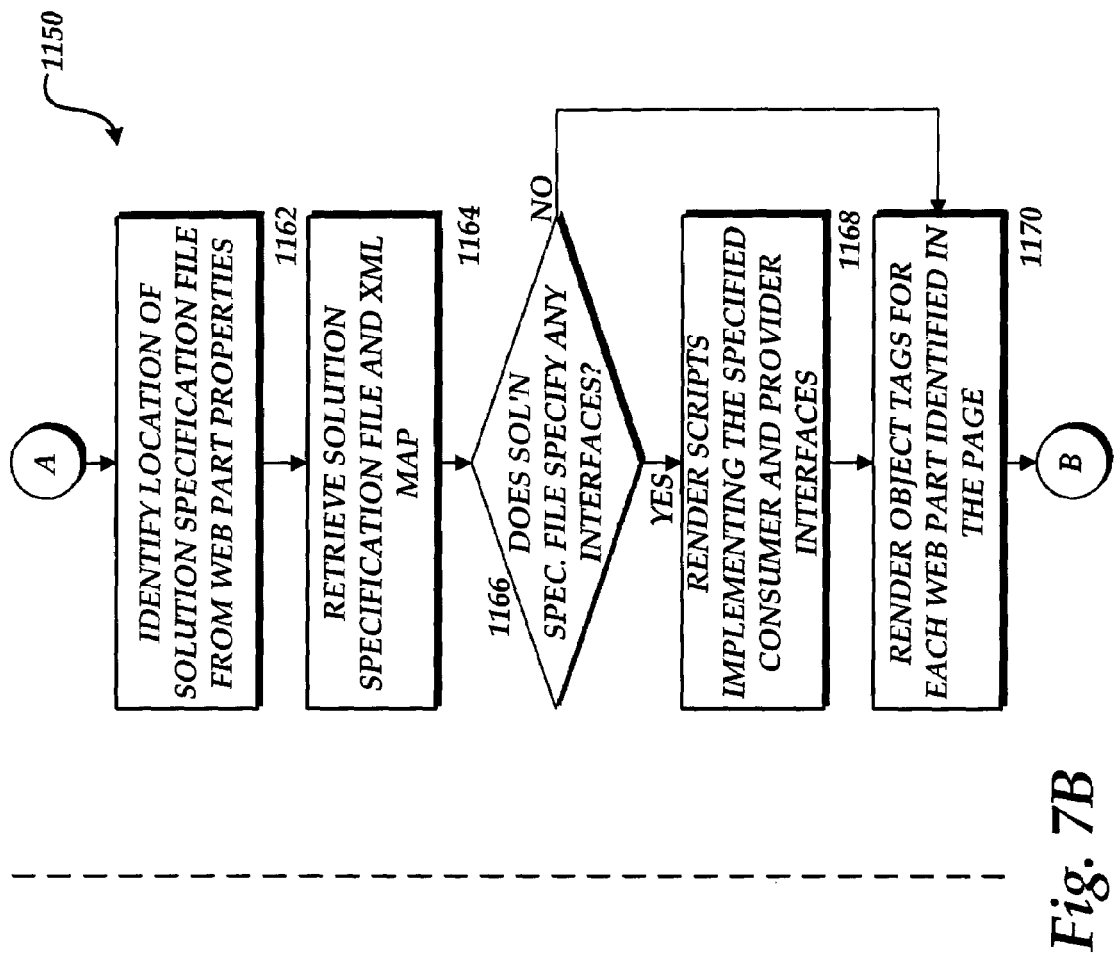
Figure 7C:
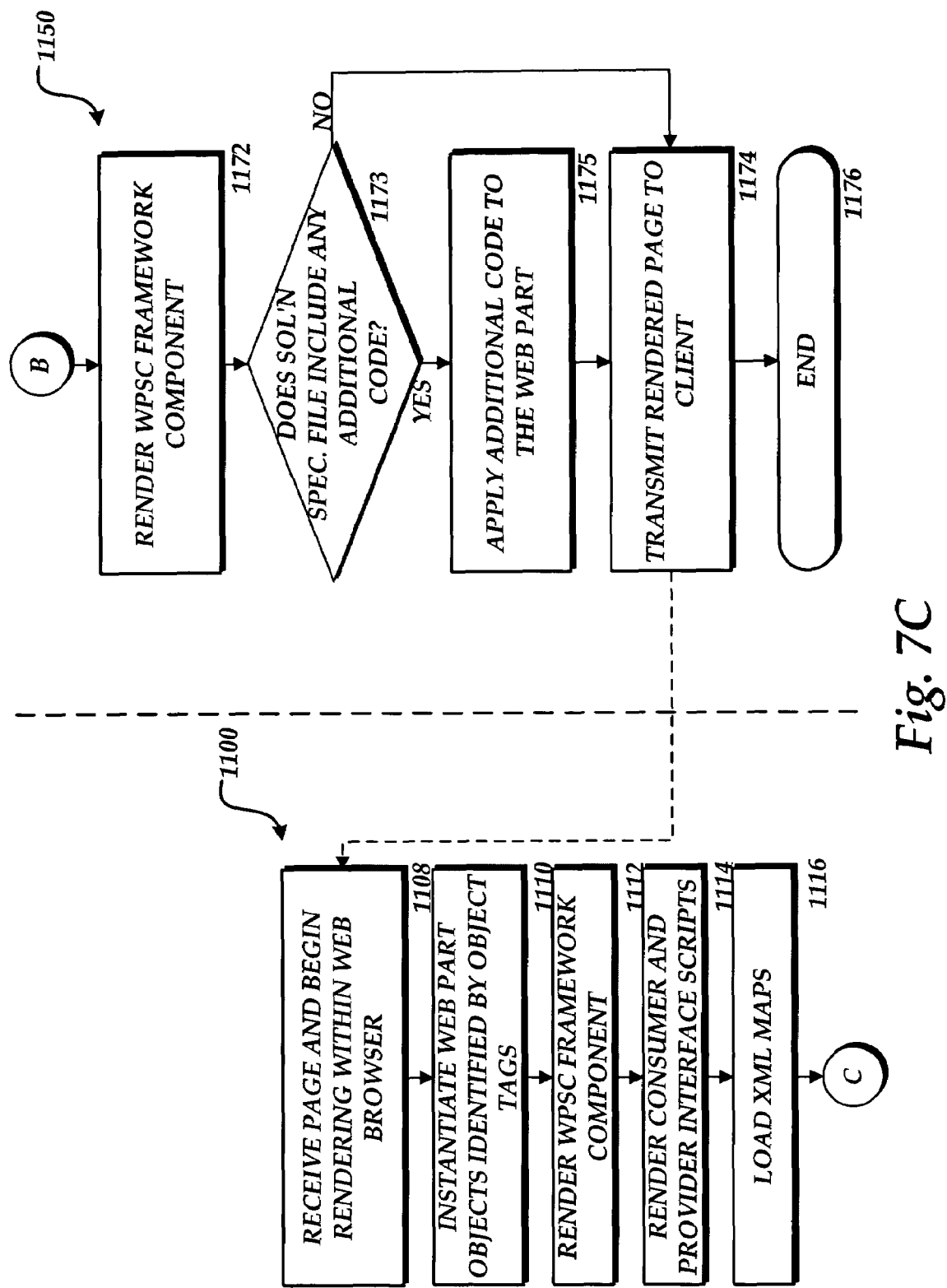
Figure 7D:
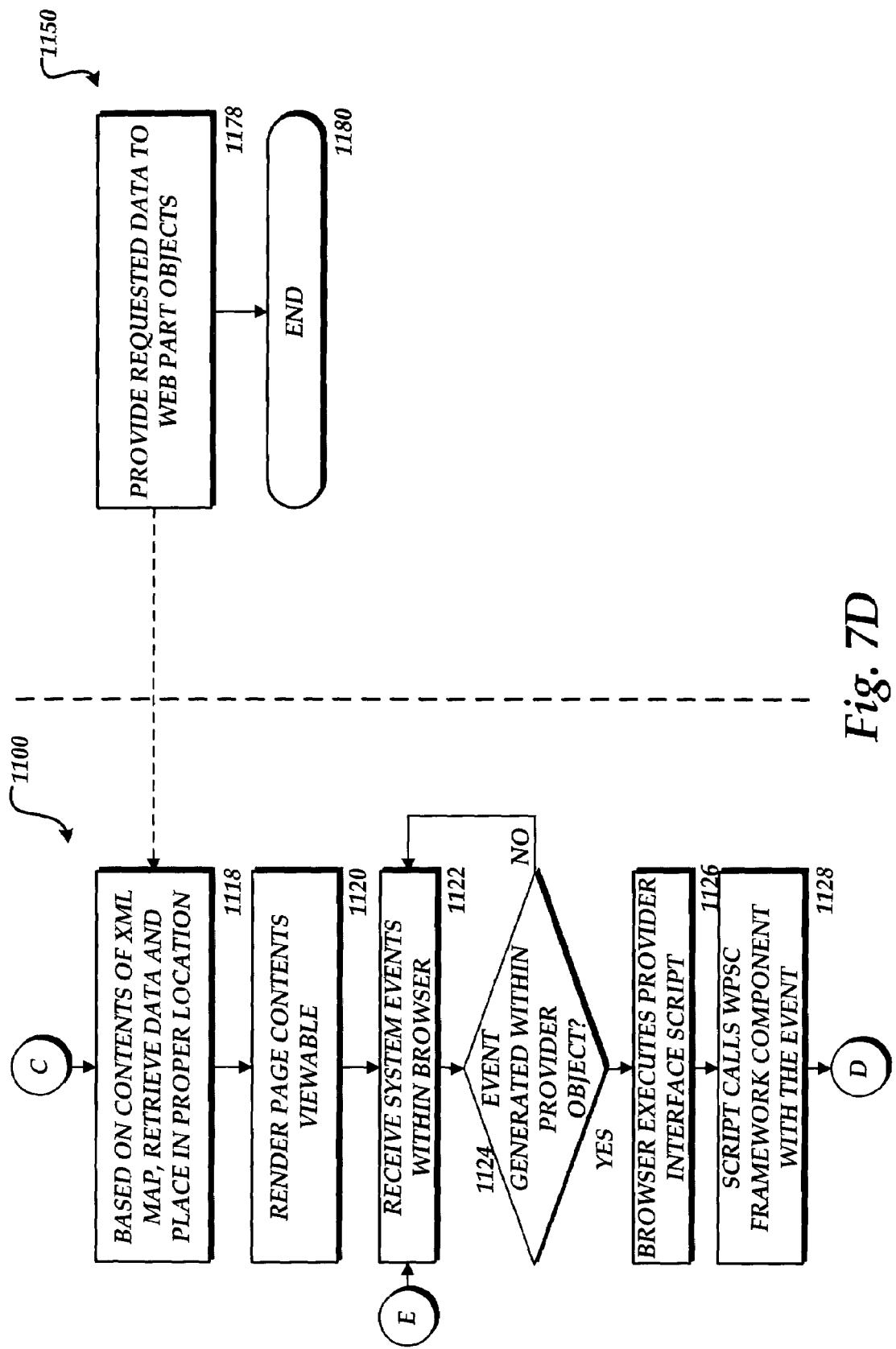
Figure 7E:
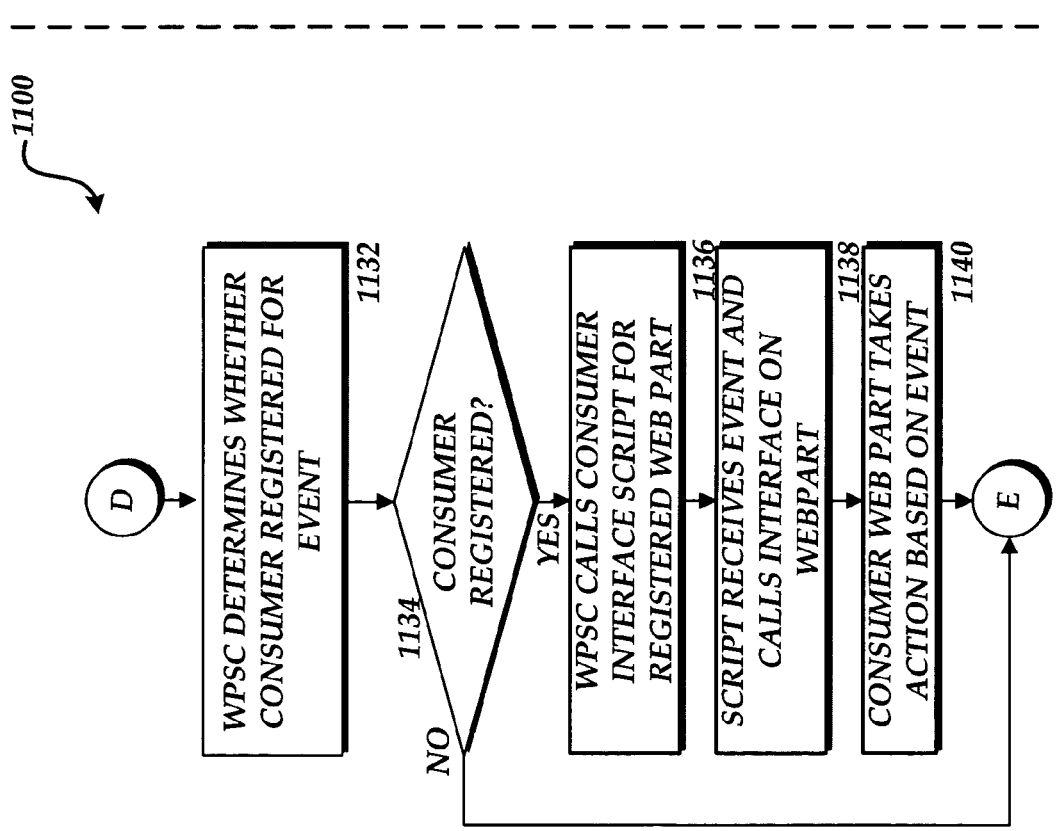

FIG. 6 illustrates the operation of both the provider interface 46 and the consumer interface 48. The interfaces 46 and 48 are rendered by the Web server application 32 and transmitted to the Web browser application 24 as a component of the Web page 26. The interfaces 46 and 48 are then executed within the scripting host of the Web browser application 24. The provider interface 46 provides an interface between the provider Web part object 28A and the WPSC 27. Similarly, the consumer interface 48 provides an interface between the consumer Web part object 28B and the WPSC 27.

An event 54 may be generated that is directed to the display provided by the provider Web part object 28A. For instance, a user may select a row in a spreadsheet provided by the Web part object 28A by causing the curser to appear in or over a row or to point to that row. This event is handled by the Web browser application 24. In particular, the Web browser application 24 identifies the provider interface 46 as a listener for the generated type of event. As a result, the Web browser application 24 calls the provider interface 46 with the event.

The provider interface 46 catches the event generated by the provider Web part object 28A and converts the event into a format compatible with the framework provided by the WPSC 27. The provider interface 46 also calls the WPSC 27 with the event. For instance, in the example described above wherein a user selects a row within a spreadsheet provided by the Web part object 28A, the provider interface 46 may call the WPSC 27 with the contents of the selected row.

A web part object or objects 28B registers its consumer object interface(s) 48, with the WPSC 27 as a consumer of certain event types. The interface passes events and/or data to the consumer Web part object 28B. When an event is received at the WPSC 27, such as that generated by the provider interface 46, the WPSC 27 identifies the consumer Web part object 28B from a list of registered consumers 52. As a result, if the Web part object 28B, with consumer interface 48, has registered as a consumer of the type of data provided by the provider interface 46, the WPSC 27 may call the consumer interface 48 when that type of event is generated—this will call into the web part object. For instance, the consumer interface 48/web part object 28B may be registered with the WPSC 27 as a consumer of spreadsheet row data. When, as described above, a row is selected within the spreadsheet provided by the Web part object 28A, and the provider interface 46 passes the spreadsheet row to the WPSC 27, this data is transmitted to the consumer interface 48 and, in turn, to the consumer Web part object 28B. A consumer Web part object 28B may then take action as specified by the consumer interface 48 on the received data. It should be appreciated that the provider and consumer interfaces are generally utilized in pairs. As a result, connections are made between two specific Web part objects over a specific interface pair.

In the preferred embodiment an object interface 48 is specific to a web part, such as web part 28B, and an interface type. For example, interface types may be, but are not limited to, "Row Consumer", "Column Consumer", and "Cell Consumer", referring to the action the consumer takes—selecting a row, a column, or a cell. This provides the WPSC 27 with information concerning all of the registered object interface 48 on a page. As each object interface 48 is associated with a particular web part 28B, the registration of the web pail 28B is implicit in the registration of the object interface 48. In an alternative embodiment, the web part 28B may directly register with the WPSC 27.

The solution specification file 38 typically includes data that indicates whether an object interface should be created for each of the Web parts referenced within a Web page and may include one or more parameters for each object interface that define the implementation of the object interface. This data is utilized by the Web server application 32 to actually render the interfaces for each of the reference objects.

The interfaces may comprise either a consumer or a provider interface. Tables 3 through 8 illustrate XML that may be included in the solution specification file 38 for defining consumer interfaces. Tables 9 and 10 illustrate XML that may included in the solution specification file 38 for defining provider interfaces.

Table 3 illustrates a row consumer interface for receiving row information from another spreadsheet Web part and for performing actions based on that data. As shown in Table 3, this particular implementation of the row consumer interface includes an execute query tag that contains all the necessary information to connect an instance of the interface to a data query. In particular, the execute query tag includes a DSP-CLIENTPARAMETER tag that contains a pairing of fields and values received via the interface in a particular data binding and parameters in the data query. This data can be utilized by the consumer Web part object 28B to perform a query based on the data contained in the received row.

TABLE 3

```
<RowConsumer Name="xxx_WPQ_" MenuLabel="yyyy"
Description="zzzz">₀...Unbounded
    <ExecuteQuery>₀...₁
        <DSPClientParameter>₁...Unbounded
    <P2PField>₁...₁</P2PField>
            <BindingID>₁...₁</BindingID>
            <ClientParameterName>₁...₁</ClientParameterName>
        </DSPClientParameter>
    </ExecuteQuery>
</RowConsumer>
```

As shown in Table 4, a row consumer interface may be defined that can utilize the received information to sort a table in a spreadsheet. The interface described by the XML shown in Table 4 includes parameters for identifying a specific table, identifying the fields within the table that should be sorted, identifying the value that should be used to key the sort, and for specifying the direction of the sort. Utilizing this information, the consumer Web part object 28B can sort a spreadsheet table based on a value provided by another Web part object.

TABLE 4

```
<RowConsumer Name="xxx_WPQ_" MenuLabel="yyyy"
Description="zzzz">
    <LocalSort>₀...₁
        <MapEntryID>₁...₁</MapEntryID>
        <P2PField>₁...₁</P2PField>
        <SortMapping>₁...unbounded
            <FieldID>₁...₁</FieldID>
            <P2PFieldValue>₁...₁</P2PFieldValue>
        </SortMapping>
        <SortDirection>₁...₁</SortDirection>
    </LocalSort>
</RowConsumer>
```

The XML shown in Table 5 provides tags for implementing a consumer interface on a Web part object 28B that executes a script. In particular, the XML shown in Table 5 includes tags that connect an instance of a consumer interface to a custom script function. The tags include data containing the script of the function to be called, the name of a function to be called, and the name of a field in a row or cell received through the interface that should be utilized by the script. In this manner, a Web part object 28B can call a custom script utilizing the contents of information provided from another Web part object 28A.

TABLE 5

```
<RowConsumer Name="xxx_WPQ_" MenuLabel="yyyy"
Description="zzzz">
    <RunScript>₀...₁
        <Script>₀₁...₀</Script>
        <FunctionName>₁...₁</FunctionName>
```

TABLE 5-continued

```
        <P2PField>₁...Unbounded</P2PField>
    </RunScript>
</RowConsumer>
```

The XML shown in Table 6 includes tags for binding a specific instance of the consumer interface to a part-to-part binding. In particular, the tags reference the particular binding identification number to be used in the part-to-part binding. The binding corresponds to a binding identification number contained in the spreadsheet utilized by the Web part object 28B. Moreover, the values received from the provider Web part are displayed in the spreadsheet according to the layout defined in the XML map 40.

TABLE 6

```
<RowConsumer Name="xxx_WPQ_" MenuLabel="yyyy"
Description="zzzz">
    <P2PBinding>₀...₁
        <BindingID>₁...₁<BindingID>
    </P2PBinding>
</RowConsumer>
```

The XML shown below in Table 7 is used to generate a filter consumer interface. The elements contained in the filter consumer interface define how the data contained in the spreadsheet table utilized by the consumer Web part object 28B should be filtered based on data received from another Web part object 28A. In this manner, the consumer Web part object 28B can filter the contents of the spreadsheet utilizing data provided through the provider interface 46.

TABLE 7

```
<FilterConsumer Name="xxx_WPQ_"
MaxConnections="-1" MenuLabel="yyyy"
Description="zzzz">₀...unbounded
    <LocalFilter>₁...₁
        <MapEntryID>₁...₁</MapEntryID>
    </LocalFilter>
</FilterConsumer>
```

The XML shown in Table 8 defines an interface on a consumer Web part object 28B for consuming parameters generated by the provider interface 46. In particular, the XML shown in Table 8 includes tags that identify a script, function, and parameter, that may be called when certain parameters are received through the consumer interface 48.

TABLE 8

```
<ParametersOutConsumer Name="xxx_WPQ_"
MaxConnections="1" MenuLabel="yyyy"
Description="zzzz">₀...unbounded
    <RunScript>₁...₁
        <Script>₀...₁</Script>
        <FunctionName>₁...₁</FunctionName>
        <ParameterName>₁...Unbounded</ParameterName>
    </RunScript>
</ParametersOutConsumer>
```

The XML shown in Table 9 defines a provider interface 46. In particular, the XML shown in Table 9 defines a row provider interface on the provider Web part object 28A. The row provider interface allows the provider Web part object 28A to provide rows of a spreadsheet to the WPSC 27 in response to the occurrence of certain types of events such as selection of a particular row. For instance, the map entry identification tag refers to a specific table to be connected to the interface. Any row selected in the table will be provided to the WPSC 27 via the interface. In this manner, the provider Web part object 28A can provide spreadsheet rows for utilization by other Web part objects, such as the consumer Web part object 28B.

TABLE 9

<RowProvider Name="xxx_WPQ_" MaxConnections="-1"
MenuLabel="yyyy" Description="zzzz">$_{0\ldots\text{unbounded}}$
    <SendRow>$_{1\ldots 1}$
        <MapEntryID>$_{1\ldots 1}$</MapEntryID>
    </SendRow>
</RowProvider>

The XML shown in Table 10 is also a provider interface. The XML shown in Table 10 defines a parameter out provider interface for providing parameters to the WPSC 27 from a provider Web part object 28A. In particular, the XML tags shown in Table 10 allow a solution provider to define parameter name and value pairs that are transmitted from the Web part object 28A through the provider interface 46 to the WPSC 27.

TABLE 10

<ParametersOutProvider Name="xxx_WPQ_"
MaxConnections="1" MenuLabel="yyyy"
Description="zzzz">$_{0\ldots\text{unbounded}}$
    <SendParameters>$_{1\ldots 1}$
        <Parameter>$_{1\ldots\text{unbounded}}$
            <ParameterName>$_{1\ldots 1}$</ParameterName>
            <DefaultValue>$_{0\ldots 1}$</DefaultValue>
            <Description>$_{1\ldots 1}$</Description>

</SendParameters>
</ParametersOutProvider>

Referring now to FIGS. 7A-7E, the process steps performed by the server computer 30 and the client computer 2 to provide a runtime object interface will be described in accordance with an exemplary embodiment of the present invention. In particular, the operation of the client computer 2 will be described with reference to the routine 1100 and the operation of the server computer 30 will be described with respect to the routine 1150. The routines 1100 and 1150 will be described together to illustrate the operations performed by both the client computer 2 and the server computer 3 in conjunction with one another.

The routine 1100 begins at block 1102, where the client computer 2 requests a Web page 26 from the server computer 30. The server computer 30 receives the request from the client computer 2 at block 1152. From block 1152, the routine 1150 continues to block 1154, where the requested Web page 26 is retrieved. Once the requested Web page has been retrieved, the Web server application 32 begins rendering the various components of the Web page 26. The Web page 26 may comprise an ASP.Net page or other type of server-side technology whereby the Web server application 32 renders the page in response to a request from a client computer.

At block 1156, the Web server application 32 determines whether the Web page 26 includes one or more Web part objects 28. If the Web page 26 does not include Web part objects, the routine 1150 continues to block 1158 where the requested Web page is generated and returned to the Web browser application 24 executing on the client computer 2. The client computer 2 receives the Web page at block 1104 and renders the page displayable within the Web browser 24. From block 1104, the routine 1100 continues to block 1106, where it ends.

If, at block 1156, it is determined that the Web page 26 includes a reference to one or more Web part objects 28, the routine 1150 branches from block 1156 to block 1160. At block 1160, the Web server application 32 passes the request for the Web part object 28 to the WPA 34. It should be appreciated that each Web part object 28 has an associated WPA 34. Each request contained in the Web page 26 for a Web part object 28 is passed to the WPA 34 associated with the requested Web part object 28.

From block 1160, the routine 1150 continues to block 1162, where the WPA 34 identifies the location of the solution specification file 38 from the Web part properties 36 associated with the requested Web part object 28. As discussed above, the solution specification file 38 may contain data indicating whether an object interface should be provided for the requested Web part object, parameters that define the interface, a pointer to an XML map 40 and additional HTML code. As also discussed above, the XML map 40 identifies to the requested Web part object 28 the location of data 42 to be utilized by the Web part object 28, and also describes the format in which this data should be presented. Accordingly, the WPA 34 retrieves the solution specification file 38 and the XML map 40 at block 1164.

At block 1166, the WPA 34 determines whether the solution specification file 38 contains data indicating that an object interface should be provided for the requested Web part object 28. If the solution specification file 38 does indicate that one or more object interfaces should be provided for the Web part object, the routine 1150 continues to block 1168. At block 1168, the Web server application 32 renders either a provider interface script 46, a consumer interface script 48, or both, into the requested Web page 26. The rendered scripts are identified and constructed based on the contents of the solution specification file 38 described above with reference to FIG. 6. From block 1168, the routine 1150 continues to block 1170.

If, at block 1166, the WPA 34 determines that no object interfaces should be provided for the Web part object 28A, the routine branches from block 1166 to block 1170. At block 1170, the Web server application 32 renders the Web part object tags 44A-44B for each Web part object 28 identified within the Web page 26. The routine 1150 then continues to block 1172, where the Web server application 32 renders the WPSC 27, the XML map 40, and any other displayable content 50 into the Web page 26. In this manner, the Web page is constructed as described above with reference to FIG. 4. The routine 1150 then continues to block 1173, where the WPA 34 determines whether any additional code, such as HTML, is included in the solution specification file 38. If the WPA 34 determines that additional code is present, such code is applied to the web part at block 1175. After the code is applied to the web part, routine 1150 continues to block 1174 where the rendered web page 26 is transmitted to the client computer 2.

If the WPA 34 determines that additional code is not present, routine 1150 continues to block 1174 where the rendered web page 26 is transmitted to the client computer 2.

It should be appreciated that the Web page 26 may be rendered all at once, in segments, or in a stream of data that is continuously transmitted and refreshed from the server computer 30 to the Web browser application 24. The routine 1150 continues from block 1174 to block 1176, where it ends.

At block 1108, the Web browser application 24 receives the Web page 26 and begins rendering the Web page within the browser environment. In particular, displayable content is rendered displayable and script content is rendered within the scripting host portion of the Web browser application 24. In particular, at block 1110, the Web part objects 28A-28B referenced within the Web page 26 are instantiated on the client computer 2. The WPSC 27, the provider interface script 46, and the consumer interface script 48 are rendered within the scripting host of the Web browser application 24 at blocks 1112 and 1114, respectively.

At block 1116, the instantiated Web part objects 28A-28B load their respective XML maps 40. Based upon the contents of the XML maps 40, the Web part objects 28 retrieve 1118 data 42 from the server computer 30 or from another network location. The server computer 30 provides the requested data to the Web part objects 28 at block 1178.

Once the Web part objects 28 have retrieved the data 42, this data is displayed in the manner set forth in the XML map 40. For instance, the XML map 40 may include data identifying where and how a spreadsheet table should be displayed by the Web part object 28. Accordingly, at block 1120, the Web browser application 24 renders the contents of the Web page 26 to be viewable. This includes displaying output provided by the Web part objects 28 and any other viewable data contained on the Web page 26.

The routine 1100 continues to block 1122, where system events are received within the Web browser application 24. For instance, a user may select a region within a displayable portion provided by a Web part object 28. In order to capture such events, the routine 1100 continues to block 1124, where a determination is made as to whether an event is generated within a display provided by a Web part object 28 that implements a provider interface. If no such event has been generated, the routine 1100 branches back to block 1122.

If, at block 1124, it is determined that an event has been generated within a Web part object 28 that implements a provider interface, the routine 1100 continues to block 1126. At block 1126, the Web browser application 24 identifies the provider interface 46 as the appropriate listener to handle the generated event. Accordingly, the Web browser application 24 executes the provider interface script 46 at block 1126. Upon execution, the provider interface 46 calls 1128 the WPSC 27 with the data generated by the event. For instance, if a user selects a row within a spreadsheet provided by a Web part object 28 implementing a row provider interface, the provider interface 46 will call the WPSC 27 with the contents of the selected row.

From block 1128, the routine 1100 continues to block 1132, where the WPSC 27 determines whether a consumer object has registered to receive notification of a particular event type from a particular provider Web part. As described above, Referring now to FIGS. 7A-7E, the process steps performed by the server computer 30 and the client computer 2 to provide a runtime object interface will be described in accordance with an exemplary embodiment of the present invention. In particular, the operation of the client computer 2 will be described with reference to the routine 1100 and the operation of the server computer 30 will be described with respect to the routine 1150. The routines 1100 and 1150 will be described together to illustrate the operations performed by both the client computer 2 and the server computer 3 in conjunction with one another.

The routine 1100 begins at block 1102, where the client computer 2 requests a Web page 26 from the server computer 30. The server computer 30 receives the request from the client computer 2 at block 1152. From block 1152, the routine 1150 continues to block 1154, where the requested Web page 26 is retrieved. Once the requested Web page has been retrieved, the Web server application 32 begins rendering the various components of the Web page 26. The Web page 26 may comprise an ASP.Net page or other type of server-side technology whereby the Web server application 32 renders the page in response to a request from a client computer.

At block 1156, the Web server application 32 determines whether the Web page 26 includes one or more Web part objects 28. If the Web page 26 does not include Web part objects, the routine 1150 continues to block 1158 where the requested Web page is generated and returned to the Web browser application 24 executing on the client computer 2. The client computer 2 receives the Web page at block 1104 and renders the page displayable within the Web browser 24. From block 1104, the routine 1100 continues to block 1106, where it ends.

If, at block 1156, it is determined that the Web page 26 includes a reference to one or more Web part objects 28, the routine 1150 branches from block 1156 to block 1160. At block 1160, the Web server application 32 passes the request for the Web part object 28 to the WPA 34. It should be appreciated that each Web part object 28 has an associated WPA 34. Each request contained in the Web page 26 for a Web part object 28 is passed to the WPA 34 associated with the requested Web part object 28.

From block 1160, the routine 1150 continues to block 1162, where the WPA 34 identifies the location of the solution specification file 38 from the Web part properties 36 associated with the requested Web part object 28. As discussed above, the solution specification file 38 may contain data indicating whether an object interface should be provided for the requested Web part object, parameters that define the interface, a pointer to an XML map 40 and additional HTML code. As also discussed above, the XML map 40 identifies to the requested Web part object 28 the location of data 42 to be utilized by the Web part object 28, and also describes the format in which this data should be presented. Accordingly, the WPA 34 retrieves the solution specification file 38 and the XML, map 40 at block 1164.

At block 1166, the WPA 34 determines whether the solution specification file 38 contains data indicating that an object interface should be provided for the requested Web part object 28. If the solution specification file 38 does indicate that one or more object interfaces should be provided for the Web part object, the routine 1150 continues to block 1168. At block 1168, the Web server application 32 renders either a provider interface script 46, a consumer interface script 48, or both, into the requested Web page 26. The rendered scripts are identified and constructed based on the contents of the solution specification file 38 described above with reference to FIG. 6. From block 1168, the routine 1150 continues to block 1170.

If, at block 1166, the WPA 34 determines that no object interfaces should be provided for the Web part object 28A, the routine branches from block 1166 to block 1170. At block 1170, the Web server application 32 renders the Web part object tags 44A-44B for each Web part object 28 identified within the Web page 26. The routine 1150 then continues to block 1172, where the Web server application 32 renders the WPSC 27, the XML map 40, and any other displayable content 50 into the Web page 26. In this manner, the Web page is constructed as described above with reference to FIG. 4. The routine 1150 then continues to block 1173, where the WPA 34 determines whether any additional code, such as HTML, is included in the solution specification file 38. If the WPA 34 determines that additional code is present, such code is applied to the web part at block 1175. After the code is applied to the web part, routine 1150 continues to block 1174 where the rendered web page 26 is transmitted to the client computer 2.

If the WPA 34 determines that additional code is not present, routine 1150 continues to block 1174 where the rendered web page 26 is transmitted to the client computer 2.

It should be appreciated that the Web page 26 may be rendered all at once, in segments, or in a stream of data that is continuously transmitted and refreshed from the server computer 30 to the Web browser application 24. The routine 1150 continues from block 1174 to block 1176, where it ends.

At block 1108, the Web browser application 24 receives the Web page 26 and begins rendering the Web page within the browser environment. In particular, displayable content is rendered displayable and script content is rendered within the scripting host portion of the Web browser application 24. In particular, at block 1110, the Web part objects 28A-28B referenced within the Web page 26 are instantiated on the client computer 2. The WPSC 27, the provider interface script 46, and the consumer interface script 48 are rendered within the scripting host of the Web browser application 24 at blocks 1112 and 1114, respectively.

At block 1116, the instantiated Web part objects 28A-28B load their respective XML maps 40. Based upon the contents of the XML maps 40, the Web part objects 28 retrieve 1118 data 42 from the server computer 30 or from another network location. The server computer 30 provides the requested data to the Web part objects 28 at block 1178.

Once the Web part objects 28 have retrieved the data 42, this data is displayed in the manner set forth in the XML map 40. For instance, the XML map 40 may include data identifying where and how a spreadsheet table should be displayed by the Web part object 28. Accordingly, at block 1120, the Web browser application 24 renders the contents of the Web page 26 to be viewable. This includes displaying output provided by the Web part objects 28 and any other viewable data contained on the Web page 26.

The routine 1100 continues to block 1122, where system events are received within the Web browser application 24. For instance, a user may select a region within a displayable portion provided by a Web part object 28. In order to capture such events, the routine 1100 continues to block 1124, where a determination is made as to whether an event is generated within a display provided by a Web part object 28 that implements a provider interface. If no such event has been generated, the routine 1100 branches back to block 1122.

If, at block 1124, it is determined that an event has been generated within a Web part object 28 that implements a provider interface, the routine 1100 continues to block 1126. At block 1126, the Web browser application 24 identifies the provider interface 46 as the appropriate listener to handle the generated event. Accordingly, the Web browser application 24 executes the provider interface script 46 at block 1126. Upon execution, the provider interface 46 calls 1128 the WPSC 27 with the data generated by the event. For instance, if a user selects a row within a spreadsheet provided by a Web part object 28 implementing a row provider interface, the provider interface 46 will call the WPSC 27 with the contents of the selected row.

From block 1128, the routine 1100 continues to block 1132, where the WPSC 27 determines whether a consumer object has registered to receive notification of a particular event type from a particular provider Web part. As described above, the consumer interface script 48 registers a Web part object 28B that implements a consumer interface with the WPSC 27 for such events. Accordingly, the WPSC 27 determines at block 1134 whether a consumer object has registered. If no consumer object has registered, the routine 1100 branches back to block 1122 where additional events are received. If a consumer object has registered with the WPSC 27 to receive notification of such events, the routine 1100 continues to block 1136.

At block 1136, the WPSC 27 calls a consumer interface script 48 associated with the registered Web part object 28B. The data received from the provider interface 46 in response to the occurrence of the event may be provided by the WPSC 27 to the consumer interface 48. At block 1138, the consumer interface script 48 receives the event and the data describing the event and calls the appropriate interface on the consumer Web part object 28B. At block 1140, the consumer Web part object 28B takes the appropriate action based on the contents of the event and the particular consumer interface implemented. For instance, as described above, according to one implemented interface, the received data may be utilized to filter data provided by the Web part object 28B. From block 1140, the routine 1100 returns to block 1122 where additional events are received and processed.

It should be appreciated that although the sequence of events described above with reference to the routines 1100 and 1150 have been described as executing in series, many of these events may actually execute in parallel. Moreover, it should be appreciated that although the description herein is of a single Web part object 28A implementing a provider interface 46 and a consumer Web part object 28B implementing a single consumer interface 48, each of these Web part objects may implement multiple consumer or provider interfaces. Moreover, each page may have any number of Web part objects contained therein and implementing any number of consumer or provider interfaces. It should further be understood that the various provider and consumer interfaces described herein are merely illustrative and that other types of interfaces may be provided and utilized with Web part objects providing other types of functionality.

Figure 9:
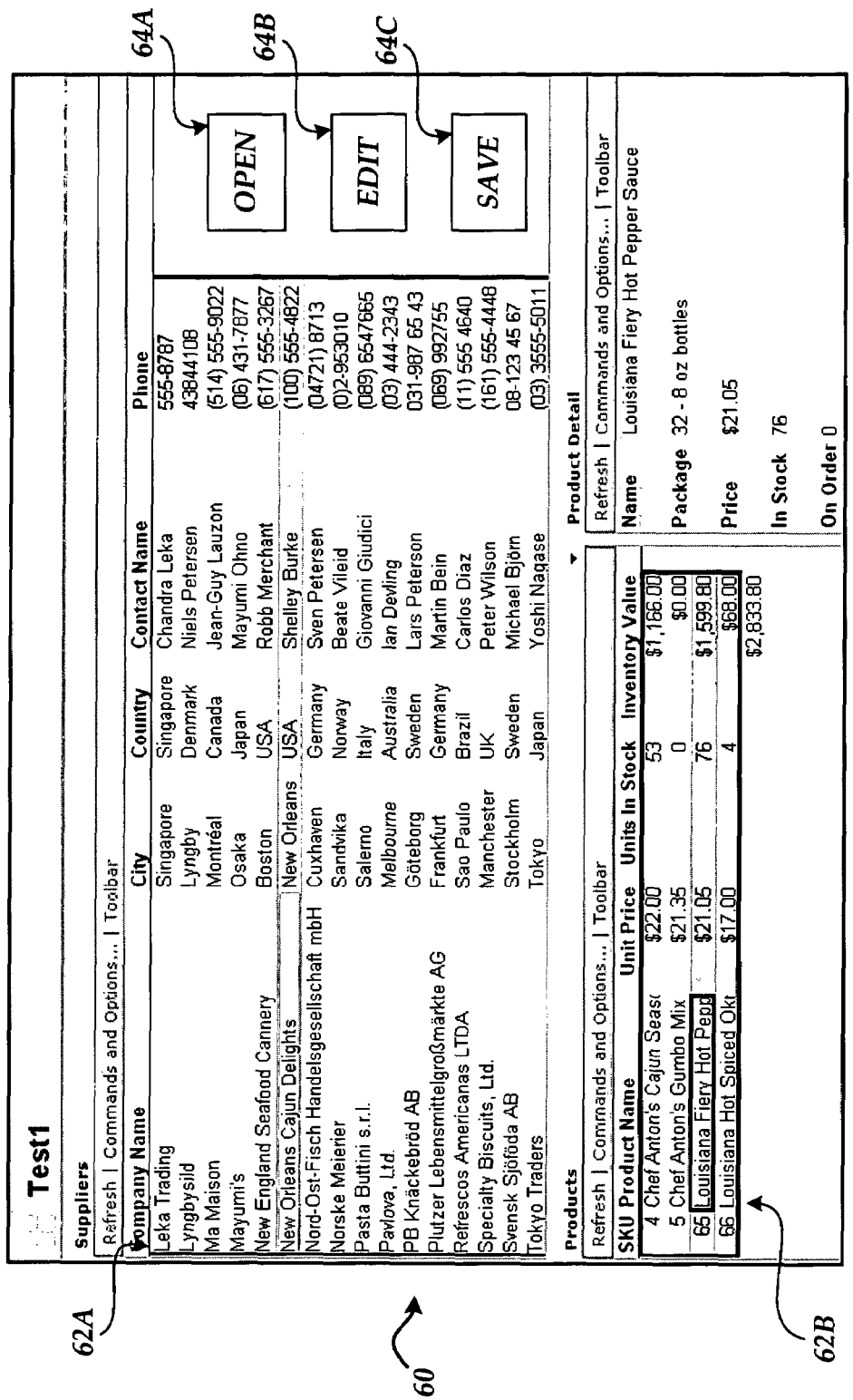
FIG. 9 shows an illustrative screen display following the modification of an included web part.

Turning now to FIG. 9, additional code in the Solution Specification File may be used to modify a web part, including adding, deleting, or modifying, elements, events, registrations, and/or displays. The additional code, which may be referred to as arbitrary code or arbitrary HTML in HTML applications, may be used to add buttons 64A-64C or other elements to a web part. Note that FIG. 9 shows a modified version of the web part 62A shown in FIG. 8. The modified version of the web part 62A shown in FIG. 9 includes added buttons 64.

In an exemplary embodiment of the present invention, a web part 62 is modified using arbitrary HTML commands within the solution specification file 38. Such arbitrary HTML commands may be used to add various features such as buttons, functions, images, selection boxes, or other web elements. These arbitrary HTML commands are operated on the rendered Web parts to modify the presentation of the web part. Once modified, the rendered web part is provided to the web page 26. Additionally, arbitrary HTML commands may be used to modify existing elements of the web part. Accordingly, spreadsheet headings, listbox titles, databindings, xml maps, and the like may be modified or changed using arbitrary HTML commands or scripts. For example, and not limitation, the additional HTML statements may be identified by an HTML tag such as <OutputHTML>. Further, such scripts may be run against the object model of a web part object 28. Table 11 below shows a sample solution specification file with arbitrary HTML. In an exemplary embodiment of the present invention, the web part assembly 34 inserts a spreadsheet activex control object tag in place of the Spreadsheet-Object token before rendering the arbitrary HTML to the client computer.

TABLE 11

```
<?xml version="1.0"?>
<SolutionSpecification
xmlns="http://schemas.microsoft.com/WebPart/v2/Spreadsheet/SolutionSpecifi-
cation">
    <OutputHTML>
    <NoOWC11>
    </NoOWC11>
    <OWC11installed>
    <![CDATA[
    Spreadsheet_Object
    <TR>
        <img border="0"
src="http://dsteam/public/ericvig/Amazon/MyAmazon.jpg">
        <td>
        <INPUT type="button" id="PagingMinus" value="Prev 10"
onclick="ChangePage(-1)" DISABLED></INPUT>
        <INPUT type="textbox" id="PageNum" size="1" READONLY></INPUT>
        <INPUT type="button" id="PagingPlus" value="Next 10"
onclick="ChangePage(1)" DISABLED></INPUT>
        </td>
        </TR>
        <script language="JavaScript">
        // Declare variables
        var objDataCalc = document.all.Spreadsheet_WPQ_;
        var shActor = objDataCalc.Worksheets("ActorSearch");
        var btnPlus = document.all.item("PagingPlus");
        var btnMinus = document.all.item("PagingMinus");
        var bindQuery =
objDataCalc.ActiveWorkbook.XmlDataBindings.Item("AmazonActor");
        var PageCounter = 1;
        var rgQueryParams = new Array();
        var rgNameValPair = new Array();
        rgNameValPair[0] = "Page";
        // Remove unwanted toolbar buttons
        var ctlButtons = objDataCalc.Toolbar.Buttons;
        var aryHideButtons = new Array(1,2,7,8,14,15);
        for (var loop = 0; loop < aryHideButtons.length; loop++)
        {
            ctlButtons.Item(aryHideButtons[loop]).Visible = "False";
        }
        // Set unlocked ranges and protect sheet
        shActor.Range("B7:I16").Locked="False";
        shActor.Range("C2").Locked="False";
        //shActor.Protect();
        shActor.Protection.AllowSorting="True";
        shActor.Protection.AllowFiltering="True";
        // Apply autofilter
        shActor.ListObjects(2).Range(1,1).AutoFilter();
        // Display all Commands & Options tabs
        objDataCalc.DisplayDesignTimeUI="true";
        // Hide toolstrip and display toolbar
        document.all.Toolbar_WPQ_.style.display = "none";
        objDataCalc.DisplayToolbar="true";
        // Set so cell selection does not change after hitting Enter
        objDataCalc.MoveAfterReturn="False";
        function ChangePage(pgAdjust)
            {
                // Pointer to hourglass & disable paging buttons
                document.body.style.cursor = "wait";
                btnMinus.disabled="true";
                btnPlus.disabled="true";
                // Update page indicator
                PageCounter = PageCounter + pgAdjust;
                document.all.item("PageNum").value=PageCounter;
                // Set parameters and refresh binding
                rgNameValPair[1] = PageCounter;
                rgQueryParams[0] = rgNameValPair;
                bindQuery.Refresh(0, rgQueryParams);
            }
        </script>
        <Script language="JavaScript" for="Spreadsheet_WPQ_"
event="SheetChange(Sh, Target)">
        // Declare variables
        var rngResults;
        var rngIntersect;
        var strSearchString;
            // Set rngResults to user-entered actor
            rngResults = shActor.Range("C2");
            // If user-entered actor string is not empty AND different than last time
```

TABLE 11-continued

```
            if ((rngResults.Value != "") && (rngResults.Value != strSearchString))
            {
            // RectIntersect method returns the overlapping range between C2 and
the sheet change range
            rngIntersect = objDataCalc.RectIntersect(rngResults, Target);
            // If cell C2 was changed . . .
            if (rngIntersect != null)
            {
                // Setup query parameters: page and actor string
                var aryPair = new Array();
                var aryParams = new Array();
                aryPair[0] = "Page";
                aryPair[1] = "1";
                aryParams[0] = aryPair;
                // Pointer to hourglass & disable paging buttons
                btnMinus.disabled=true;
                    btnPlus.disabled=true;
                    document.body.style.cursor = "wait";
                // Refresh query with first page and user entered actor string
                try
                {
            bindQuery.Refresh(0,aryParams);
            }
            catch(e)
            {
                alert(e);
            }
                // Update page counter
                PageCounter = 1;
                document.all.item("PageNum").value=PageCounter;
                //alert(PageCounter);
                //Update strSearchString (used to check if user-entered string has
changed since last time the event fired)
                strSearchString = objDataCalc.ActiveSheet.Range("C2").Value;
            }
        }
        </Script>
        <Script language="JavaScript" for="Spreadsheet_WPQ_"
event="BindingError(BindingID, strAction, DialogText, FaultCode, FaultString,
FaultDetail)">
            alert("Binding Failed");
            document.body.style.cursor = "default";
            btnPlus.disabled=false;
            btnMinus.disabled=false;
        </Script>
        <Script language="JavaScript" for="Spreadsheet_WPQ_"
event="BindingCompleted(BindingID, strAction)">
            //alert("Binding Completed");
            document.body.style.cursor = "default";
            // Declare variables
            var RecordCount;
            var DisplayLimit;
            // Set variables for data source record count and displayable count
            RecordCount = shActor.Range("C4").Value;
            DisplayLimit = PageCounter * 10;
            // Disable "Next 10" button if displayable count is less that data source
record count
            if (DisplayLimit < RecordCount)
            {
                btnPlus.disabled=false;
            }
            // Disable "Prey 10" button if current page is 1
            if (PageCounter != 1)
            {
                btnMinus.disabled=false;
            }
        // Select first row after binding
        if (shActor.ListObjects(2).ListRows.Count > 0)
        {
            shActor.ListObjects(2).DataBodyRange(1,1).Select();
        }
        // Check for status error
        if (shActor.ListObjects(1).DataBodyRange(1,1).Value != null)
        {
            alert(shActor.ListObjects(1).DataBodyRange(1,1).Value);
        }
        </script>
        ]]>
        </OWC11installed>
```

TABLE 11-continued

```
      </OutputHTML>
      <WebPartSettings>
         <LockedDown>True</LockedDown>
         <XMLSSFileLocation>/XMLSS
Files/ActorSearchXMLSS.xml<XMLSSFileLocation>
      </WebPartSettings>
      <InterfaceConnections>
         <RowProvider Name="RowProvider1_WPQ_" MaxConnections="-1"
MenuLabel="Send selected row" Description="Send DVD info to . . . ">
            <SendRow>
               <MapEntryID>foo</MapEntryID>
            </SendRow>
         </RowProvider>
      </InterfaceConnections>
   </SolutionSpecification>
```

Although the exemplary embodiment described above refers to the use of the solution specification file 38 in conjunction with web part 34, the present invention is not so limited. The web page 26 or the web server application 32 may call the solution specification file 38 directly, rather than through the web part 34. In this case the contribution, if any, of a web part 34 would be compensated for or provided by the solution specification file 38 or some other component.

Based on the foregoing, it should be appreciated that the various embodiments of the invention provide a method, system, apparatus, computer-readable medium for dynamically implementing an object interface at runtime and for easily and conveniently changing the interface. The logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as defined by the claims below.

We claim:

1. A method, executing within a computer system having at least one processor, of providing a customized web part, the method comprising:
    accessing a web part assembly which is capable of providing a presentation of a web part;
    accessing a specification file associated with the web part, wherein the specification file comprises data indicating whether the web part should be modified and a pointer to an extensible markup language (XML) map, wherein the XML map is utilized, by the web part, to locate, retrieve, format, and display source data, the source data being stored at any location on a distributed computing network; and
    modifying the presentation of the web part in accordance with the specification file and the data indicating whether the web part should be modified to provide a modified presentation as at least a portion of the customized web part.

2. The method of claim 1, wherein modifying the presentation of the web part in accordance with the specification file is performed by executing code embedded in the specification file.

3. The method of claim 2, wherein the code embedded in the specification file is HTML code.

4. The method of claim 2, wherein the code embedded in the specification file is JAVA script.

5. The method of claim 2, wherein the web part consists essentially of compiled code and wherein the code embedded in the specification file has not been compiled.

6. The method of claim 1, wherein modifying the presentation of the web part in accordance with the specification file comprises adding an element to the web part.

7. The method of claim 1, wherein modifying the presentation of the web part in accordance with the specification file comprises changing a characteristic of an existing element of the web part.

8. The method of claim 1, wherein modifying the presentation of the web part in accordance with the specification file comprises deleting an element of the web part.

9. A computer-readable storage medium which stores a set of instructions which, when executed by a computer, cause the computer to perform the method of claim 1.

10. A computer-controlled apparatus capable of performing the method of claim 1.

11. The method of claim 1, wherein the specification file further comprises additional data indicating whether at least one object interface should be implemented for the web part.

12. The method of claim 1, wherein the specification file defines an object interface implementation.

13. The method of claim 1, wherein the specification file further comprises code for customizing the web part.

14. A system for providing a customized presentation of a web part, the system comprising:
    a storage device adapted to store a web part assembly and a specification file, the web part assembly containing code for a web part presentation, the specification file comprising data indicating whether the web part should be modified and a pointer to an XML map, wherein the XML map is configured to be utilized, by the web part, to locate, retrieve, format, and display source data, the source data being stored at any location on a distributed computing network; and
    a processing device responsive to the code in the web part assembly for providing the web part presentation, and responsive to the code and the data indicating whether the web part should be modified in the specification file for modifying the web part presentation.

15. The system of claim 14, wherein the code imbedded in the specification file is HTML code.

16. The system of claim 14, wherein the code imbedded in the specification file is JAVA script.

17. The system of claim 14, wherein the code imbedded in the specification file is not compiled code.

18. The system of claim 14, wherein the storage device comprises a first storage device for storing the web part assembly and a second storage device for storing the specification file.

19. A server operative to:
receive a request, from a requesting device, for a web page;
access a web part assembly which is capable of providing a presentation of a web part;
access a specification file associated with the web part, wherein the specification file comprises data indicating whether the web part should be modified and a pointer to an XML map, wherein the XML map is configured to be utilized, by the web part, to locate, retrieve, format, and display source data, the source data being stored at any location on a distributed computing network;
modify the presentation of the web part in accordance with the specification file and the data indicating whether the web part should be modified to provide a modified presentation as at least a portion of a customized web part;
render a web page representative of the modified presentation; and
send the rendered web page to the requesting device.

20. The system of claim 19, wherein the specification file further comprises additional data indicating whether at least one object interface should be implemented for the web part and code for customizing the web part, wherein the specification file defines implementation of an object interface.

\* \* \* \* \*